US011149159B2

(12) United States Patent
Okuda et al.

(10) Patent No.: US 11,149,159 B2
(45) Date of Patent: Oct. 19, 2021

(54) WATER-BASED INK JET INK COMPOSITION, RECORDING METHOD, AND RECORDING APPARATUS

(71) Applicant: Seiko Epson Corporation, Tokyo (JP)

(72) Inventors: Ippei Okuda, Shiojiri (JP); Tsuyoshi Sano, Shiojiri (JP)

(73) Assignee: Seiko Epson Corporation ( * ) Notice: Subject to any disclaimer, the term of this patent is extended or adjusted under 35 U.S.C. 154(b) by 193 days.

(21) Appl. No.: 16/354,300

(22) Filed: Mar. 15, 2019

(65) Prior Publication Data

US 2019/0284411 A1 Sep. 19, 2019

(30) Foreign Application Priority Data

Mar. 16, 2018 (JP) .............................. JP2018-049421

(51) Int. Cl.
C09D 11/322 (2014.01)
C09D 11/54 (2014.01)
B41M 5/00 (2006.01)
C09D 11/324 (2014.01)
C09D 11/033 (2014.01)
C09D 11/037 (2014.01)
C09D 11/102 (2014.01)
C09D 11/107 (2014.01)

(52) U.S. Cl.
CPC ......... C09D 11/322 (2013.01); B41M 5/0017 (2013.01); B41M 5/0023 (2013.01); C09D 11/033 (2013.01); C09D 11/037 (2013.01); C09D 11/102 (2013.01); C09D 11/107 (2013.01); C09D 11/324 (2013.01); C09D 11/54 (2013.01)

(58) Field of Classification Search
CPC ....................................................... C09D 11/54
See application file for complete search history.

(56) References Cited

U.S. PATENT DOCUMENTS

2017/0166767 A1* 6/2017 Watanabe ............ C09D 11/322
2017/0232763 A1* 8/2017 Okuda ................... C09D 11/10
347/21

FOREIGN PATENT DOCUMENTS

JP 2004-338259 A 12/2004
JP 2005-246905 A 9/2005
JP 2017-110182 A 6/2017

* cited by examiner

Primary Examiner — Vu A Nguyen
(74) Attorney, Agent, or Firm — Harness, Dickey & Pierce, P.L.C.

(57) ABSTRACT

A water-based ink jet ink composition includes: a coloring material; and resin, a content of the coloring material being equal to or less than 1.5% by mass with respect to the ink composition, a change in a volume average particle diameter of the resin after mixing a water-mediated solution for the resin and a 0.3 M magnesium sulfate aqueous solution is equal to or less than three times as large as a change in the volume average particle diameter before the mixing, and the ink composition is used by being caused to adhere to a recording medium along with a processing solution that contains a coagulant for coagulating constituents of the ink composition.

20 Claims, 1 Drawing Sheet

WATER-BASED INK JET INK COMPOSITION, RECORDING METHOD, AND RECORDING APPARATUS

BACKGROUND

1. Technical Field

The present invention relates to a water-based ink jet ink composition, a recording method, and a recording apparatus.

2. Related Art

An ink jet recording method of causing nozzles of an ejection head of an ink jet recording apparatus to eject minute ink droplets and recording an image on a recording medium is known. In recent years, the ink jet recording method has been used not only for recording an image on a recording medium with excellent ink absorbability such as an ordinary paper but also recording an image on a low-absorbable recording medium with low ink absorbability such as an art paper or a coated paper, for example, or on a non-absorbable recording medium that hardly absorbs ink, such as a plastic film, for example. In addition, a water-based ink jet ink composition (hereinafter, also referred to as "water-based ink" or "ink") that contains water as a base has also been used for recording an image on such a low-absorbable recording medium or a non-absorbable recording medium.

For performing recording using a water-based ink jet ink composition, there is a technology of using ink that contains constituents with reactivity such as resin and a processing solution for coagulating constituents of the ink in combination in order to obtain an image with excellent abrasion resistance and image quality, and the processing solution is often used for performing recording on a low-absorbable recording medium or a non-absorbable recording medium, in particular (see JP-A-2017-110182, for example).

SUMMARY

An advantage of some aspects of the invention is to provide a recording method providing excellent abrasion resistance in a case in which excellent image quality is obtained using a processing solution in such a recording method, in particular, in the recording using a water-based ink jet ink composition and a processing solution with a small content of coloring materials in combination.

APPLICATION EXAMPLE 1

According to an aspect of the invention, there is provided a water-based ink jet ink composition including: a coloring material; and resin, a content of the coloring material being equal to or less than 1.5% by mass with respect to the ink composition, in which a change in a volume average particle diameter of the resin after mixing a water-mediated solution for the resin and a 0.3M magnesium sulfate aqueous solution is equal to or less than three times as large as a change in the volume average particle diameter before the mixing, and the ink composition is used by being caused to adhere to a recording medium along with a processing solution that contains a coagulant for coagulating constituents of the ink composition.

APPLICATION EXAMPLE 2

In Application Example 1, the ink composition may be a light ink composition that is used by being caused to adhere to the recording medium along with a dark ink composition, the light ink composition and the dark ink composition belonging to a same color system.

APPLICATION EXAMPLE 3

In Application Example 1 or 2, a content of the resin may be equal to or greater than 2% by mass.

APPLICATION EXAMPLE 4

In any one of Application Examples 1 to 3, the ink composition may include any one or more kinds of cationic resin, organic acids, and polyvalent metal salts as the coagulant that is included in the processing solution.

APPLICATION EXAMPLE 5

In any one of Application Examples 1 to 4, a content of an organic solvent of polyols with a standard boiling point of equal to or greater than 280° C. may be equal to or less than 0.8% by mass with respect to the ink composition.

APPLICATION EXAMPLE 6

In any one of Application Examples 1 to 5, the water-based ink jet ink composition may further include: a nitrogen-containing solvent.

APPLICATION EXAMPLE 7

In any one of Application Examples 1 to 6, the ink composition may be light black ink.

APPLICATION EXAMPLE 8

In any one of Application Examples 2 to 7, the dark ink composition may include resin, and a content of the resin may be equal to or greater than 2% by mass.

APPLICATION EXAMPLE 9

In any one of Application Examples 2 to 8, the dark ink composition and the light ink composition respectively may include coloring materials, and a content of the coloring material in the dark ink composition may be greater than a content of the coloring material in the light ink composition by 1% by mass or greater.

APPLICATION EXAMPLE 10

In any one of Application Examples 1 to 9, the resin may include either acrylic resin or urethane-based resin.

APPLICATION EXAMPLE 11

In Application Examples 9 or 10, a pigment may be included as the coloring material, and a change in a volume average particle diameter after mixing a water-mediated solution of the pigment and a 0.3M magnesium sulfate aqueous solution may be greater than three times as large as a change in the volume average particle diameter before the mixing.

APPLICATION EXAMPLE 12

According to another aspect of the invention, there is provided a recording method using the water-based ink jet ink composition according to any one of Application Examples to 11, the method including: causing the processing solution to adhere to a recording medium; and causing the water-based ink jet ink composition to adhere to the recording medium.

APPLICATION EXAMPLE 13

In Application Example 12, a region in which an amount of the adhering water-based ink jet ink composition is equal to or less than 8 mg/inch$^2$ may be included in a recording region, to which the processing solution and the water-based ink jet ink composition a caused to adhere, on the recording medium.

APPLICATION EXAMPLE 14

In Application Example 13, a region in which an amount of the adhering dark ink composition is greater than 8 mg/inch$^2$ may be further included in a region to which the processing solution and the dark ink composition that belongs to a same color system as a color system of the water-based ink jet ink composition and has a high color density are caused to adhere.

APPLICATION EXAMPLE 15

In any one of Application Examples 12 to 14, recording may be performed on a low-absorbable recording medium and a non-absorbable recording medium.

APPLICATION EXAMPLE 16

According to yet another aspect of the invention, there is provided a recording method using a water-based ink jet ink composition and a processing solution, in which the water-based ink jet ink composition contains a coloring material and resin, a content of the coloring material is equal to or less than 1.5% by mass with respect to the ink composition, and a change in a volume average particle diameter of the resin after mixing a water-mediated solution of the resin and the processing solution is equal to or less than three times as large as a change in the volume average particle diameter before the mixing, in which the processing solution contains a coagulant for coagulating constituents of the ink composition, the method including: causing the processing solution to adhere to a recording medium; and causing the water-based ink jet ink composition to adhere to the recording medium.

APPLICATION EXAMPLE 17

According to still another aspect of the invention, there is provided a recording apparatus that performs recording by the recording method according to any one of Application Examples 12 to 16.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
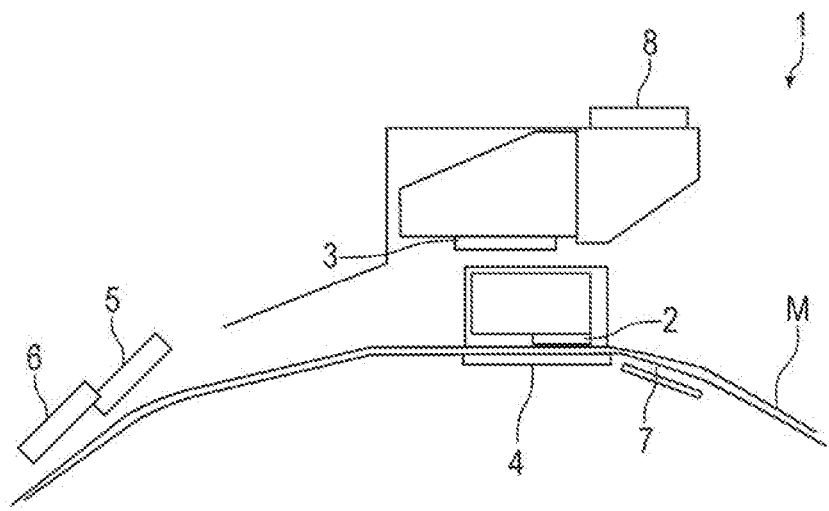
FIG. 1 is an outline sectional view schematically illustrating an ink jet recording apparatus.

Hereinafter, a preferred embodiment of the invention (hereinafter, referred to as an "embodiment") will be described. The embodiment described below describes examples of the invention. In addition, the invention is not limited to the following embodiment, and various modification examples that are performed without changing the gist of the invention are also included therein.

A water-based ink jet ink composition according to an embodiment includes: a coloring material; and resin, a content of the coloring material being equal to or less than 1.5% by mass with respect to the ink composition, a change in a volume average particle diameter of the resin after mixing a water-mediated solution for the resin and a 0.3M magnesium sulfate aqueous solution is equal to or less than three times as large as a change in the volume average particle diameter before the mixing, and the ink composition is used by being caused to adhere to a recording medium along with a processing solution that contains a coagulant for coagulating constituents of the ink composition.

A recording method according to an embodiment uses the water-based ink jet ink composition according to the embodiment and includes: causing the processing solution to adhere to a recording medium; and causing the water-based ink jet ink composition to adhere to the recording medium.

A recording method according to another embodiment uses a water-based ink jet ink composition and a processing solution, the water-based ink jet ink composition contains a coloring material and resin, a content of the coloring material is equal to or less than 1.5% by mass with respect to the ink composition, a change in a volume average particle diameter of the resin after mixing a water-mediated solution of the resin and the processing solution is equal to or less than three times as large as that before the mixing, and the method includes: causing the processing solution to adhere to a recording medium; and causing the water-based ink jet ink composition to adhere to the recording medium.

Further, according to an aspect of the embodiment, a recording apparatus performs the recording method according to the embodiment.

Hereinafter, an example of a water-based ink jet ink composition, a recording method, and a recording apparatus according to the embodiment will be described in the order of a recording apparatus that performs a recording method, a water-based ink jet ink composition (hereinafter, also referred to as "ink") that form an ink set, a processing solution, a recording medium, and a recording method.

Note that in the specification, "duty" is a value calculated by Equation (1) below.

$$\text{Duty (\%)} = \{\text{number of actually printed dots}/(\text{vertical resolution} \times \text{horizontal resolution})\} \times 100 \qquad (1)$$

(In the equation, the "number of actually printed dots" represents the number of actually printed dots per unit area, and "vertical resolution" and "horizontal resolution" are respectively resolution per unit area.)

1. RESPECTIVE CONFIGURATIONS 1.1. Recording Apparatus

An example of the recording apparatus that performs the recording method according to the embodiment will be described by exemplifying an ink jet recording apparatus. Note that the example of the recording apparatus that can be used for the recording method according to the embodiment is not limited to the ink jet recording apparatus.

An example of the ink jet recording apparatus used in the embodiment will be described with reference to drawings. FIG. 1 is an outline sectional view schematically illustrating the ink jet recording apparatus. As illustrated in FIG. 1, an ink jet recording apparatus 1 includes an ink jet head 2, an IR heater 3, a platen heater 4, a hardening heater 5, a cooling fan 6, a preheater 7, and a ventilation fan 8. The ink jet recording apparatus 1 includes a control unit, which is not illustrated in the drawing, and operations of the entire ink jet recording apparatus 1 are controlled by the control unit.

The ink jet head 2 is a mechanism that ejects an ink composition and a processing solution and causes the ink composition and the processing solution to adhere to a recording medium M.

The ink jet head 2 includes nozzles (not illustrated) that eject the ink composition and the processing solution. As a scheme of causing the nozzles to eject ink, a scheme of applying a strong electric field between the nozzles and an acceleration electrode placed in front of the nozzles, causing the nozzles to successively eject ink in the form of droplets, and causing the nozzle to eject the ink in accordance with recording information signals while the ink droplets fly between deflection electrodes (electrostatic suctioning scheme); a scheme of applying a pressure to the ink using a small pump, mechanically oscillating the nozzles with crystal oscillators or the like, thereby forcibly causing the nozzles to eject ink droplets; a scheme of simultaneously applying a pressure and recording information signals to the ink at the same time with a piezoelectric element and ejecting and recording ink droplets (piezoelectric scheme); and a scheme of heating and foaming the ink with a minute electrode in accordance with recording information signals and ejecting and recording ink droplets (thermal jet scheme), and the like are exemplified.

As the ink jet head 2, either a line-type ink jet head or a serial-type ink jet head can be used.

Here, an ink jet recording apparatus including a serial-type ink jet head is adapted to perform recording by performing scanning (pass) of causing an ink jet head for recording to eject the ink composition a plurality of times while relatively moving the ink jet head for recording relative to a recording medium. Specific examples of the serial-type ink jet head include an ink jet head that is mounted on a carriage that moves in a width direction of the recording medium, that is, a direction that intersects a transport direction of the recording medium and that ejects liquid droplets onto the recording medium by the ink jet head moving with movement of the carriage.

For example, the ink jet head 2 is mounted on a carriage, which is not illustrated in the drawing, in FIG. 1, and it is only necessary that scanning (main scanning) of ejecting the ink composition from the ink jet head and causing the ink composition to adhere to the recording medium (main scanning) be performed while the carriage moves in a closer side-further side direction (main scanning direction). Recording is performed by alternately repeating the main scanning and transporting of the recording medium (sub scanning).

Meanwhile, an ink jet recording apparatus including a line-type ink jet head performs recording by performing scanning (pass) of causing an ink jet head for recording to eject the ink composition once while relatively moving the ink jet head for recording relative to the recording medium. Specific examples of the line-type ink jet head include an ink jet head that is formed to have a width that is greater than the width of the recording medium and ejects liquid droplets onto the recording medium without causing the ink jet head for recording to move.

Figure 2:
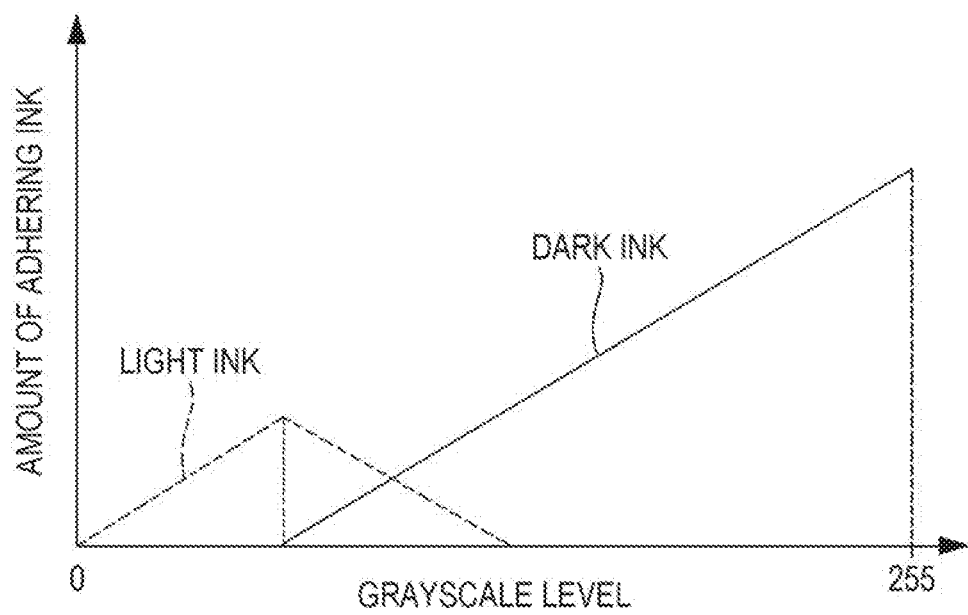
FIG. 2 is a diagram illustrating a relationship between a grayscale level and an amount of adhering ink when an image is formed using dark and light ink.

For example, the ink jet head 2 is a line head that has a length corresponding to the width of the recording medium in the close side-further side direction (width direction) in FIG. 2, and recording is performed by performing scanning of ejecting the ink composition from ink jet head and causing the ink composition to adhere to the recording medium while transporting the recording medium.

In the embodiment, an ink jet recording apparatus including a serial-type ink jet head is used as the ink jet recording apparatus 1, and the ink jet head 2 using a piezoelectric scheme as a scheme of ejecting ink from the nozzles is used.

The ink jet recording apparatus 1 includes an IR heater 3 and a platen heater 4 for heating the recording medium M when the ink composition and the processing solution are ejected from the ink jet head 2, that is, for primary heating or primary drying. In the embodiment, at least one of the IR heater 3 and the platen heater 4 may be used when the recording medium M is heated in the process of causing the ink composition to adhere, which will be described later.

Note that if the IR heater 3 is used, it is possible to heat the recording medium M from the side of the ink jet head 2. Although the ink jet head 2 is also heated at the same time in this manner, it is possible to raise a temperature without being affected by the thickness of the recording medium M as compared with a case in which the recording medium M is heated from the rear surface with the platen heater 4 or the like. If the platen heater 4 is used when the recording medium M is heated, it is possible to heat the recording medium M from the side of the ink jet head 2 and the opposite side. In this manner, the ink jet head 2 relatively tends not to be heated.

An upper limit of a surface temperature of the recording medium M heated by the IR heater 3 and the platen heater 4 is preferably equal to or less than 45° C., is more preferably equal to or less than 40° C., is further preferably equal to or less than 38° C., and is particularly preferably equal to or less than 35° C. A lower limit of the surface temperature of the recording medium M is preferably equal to or greater than 25° C., is more preferably equal to or greater than 28° C., and is further preferably equal to or greater than 30° C., and is particularly preferably equal to or greater than 32° C. In this manner, since radiant heat received from the IR heater 3 and the platen heater 4 is reduced or eliminated, it is possible to prevent the ink composition in the ink jet head 2 from drying, to prevent the compositions from varying, and to prevent the ink and the resin from welding to the inner wall of the ink jet head 2. Also, it is possible to fix the ink early and to improve image quality.

The hardening heater 5 is a heater for drying or solidifying the ink composition that has adhered to the recording medium M, that is, for secondary heating or secondary drying. Moisture or the like included in the ink composition quickly evaporate and fly by the hardening heater 5 heating the recording medium M on which an image has been recorded, and an ink film s formed with the resin in the form of fine resin particles included in the ink composition. In this manner, the ink film is firmly fixed or bonded to the recording medium M, excellent film formation properties are achieved, and it is possible to obtain an image with excellent image quality in a short time. An upper limit of the surface temperature of the recording medium M heated with the hardening heater 5 is preferably equal to or less than 120° C., is more preferably equal to or less than 100° C., and is further preferably equal to or less than 90° C. A lower limit of the surface temperature of the recording medium M is preferably equal to or greater than 60° C., is more preferably equal to or greater than 70° C., and is further preferably equal to or greater than 80° C. If the temperature falls within the aforementioned range, it is possible to obtain an image with high image quality in a short time.

The ink jet recording apparatus 1 may have the cooling fan 6. It is possible to form an ink coated film with satisfactory adhesiveness on the recording medium M by cooling the ink composition on the recording medium M with the cooling fan 6 after the ink composition recorded on the recording medium M is dried.

The ink jet recording apparatus 1 may include the preheater 7 that preheats the recording medium M before the ink composition is caused to adhere to the recording medium M. Further, the recording apparatus 1 may include the ventilation fan 8 for more efficiently drying the ink composition and the processing solution adhering to the recording medium M.

1.2. Water-Based Ink Jet Ink Composition

Next, the water-based ink jet ink composition according to the embodiment will be described.

The water-based ink jet ink composition according to the embodiment contains a coloring material and resin, the content of the coloring material is equal to or less than 1.5% by mass with respect to the ink composition, a volume average particle diameter of the resin after mixing a water-mediated solution of the resin and a 0.3M magnesium sulfate aqueous solution is equal to or less than three times as large as that before the mixing, and the ink composition is used by being caused to adhere to a recording medium along with a processing solution that contains a coagulant for coagulating constituents of the ink composition.

The water-based ink jet ink composition according to the embodiment may be a light ink composition that is used along with a dark ink composition that belongs to the same color system.

The ink that belongs to the "same color system" means at least any of the following ink.

(A) Ink that are considered to belong to the same color system from their ink names such as cyan ink and light cyan ink (also referred to as photo cyan ink), magenta ink and light magenta ink (also referred to as photo magenta ink), yellow ink and dark yellow ink, and black ink and gray ink.

(B) Light ink composition and dark ink composition with which images are recorded on a white recording medium such that a difference in hue angles ∠H° is within 30°. Here, the hue angle ∠H° is defined in a CIELAB color space and is obtained by ∠H°=$\tan^{-1}$(b*/a*)+180 (in the case of a*<0) or ∠H°=$\tan^{-1}$ (b*/a*)+360 (in the case of a*>0). a* and b* represent chromaticness indexes defined in the CIELAB color space.

Here, images that are suitable for checking ink colors are recorded by recording the images with 10 mg/inch$^2$ of adhering ink, for example. Color measurement is performed by a color measurement device in accordance with CIELAB. The difference in the hue angles ∠H° is preferably within 10° and is further preferably within 5°.

(C) Ink that contains coloring materials that belong to the same groups when the coloring materials are grouped into yellow coloring materials, cyan coloring materials, magenta coloring materials, black coloring materials, or the like. Preferably, ink that contains the same coloring material.

The dark ink and the light ink that belong to the same color system means at least any of the following ink.

(A) Ink that contains mutually different contents of coloring materials in terms of mass. Here, in the light ink composition and the dark ink composition, the ink composition that contains a larger content of coloring material is assumed to be the dark ink composition (hereinafter, also referred to as "dark ink"), and the ink composition that contains a smaller content of coloring material than the dark ink composition is assumed to be the light ink composition (hereinafter, also referred to as "light ink").

(B) Ink that exhibits different image densities when the amounts of adhering ink are set to be the same, images are recorded, and the colors are measured. This is determined on the basis of brightness L*. Here, image recording and color measurement are performed in the same manner as that described above. The ink composition that exhibits a higher image density is assumed to be the dark ink composition, and the ink composition that exhibits a lower image density is assumed to be the light ink composition.

As for such a combination of the dark ink and the light ink that belong to the same color system, the dark ink and the light ink that respectively include only the same coloring material can be regarded as ink of the same color system.

Note that in the specification, the "water-based" composition is a composition that contains water as one main solvent. The content of water in the composition is preferably equal to or greater than 40% by mass, is further preferably equal to or greater than 45% by mass, is more preferably equal to or greater than 50% by mass, and is particularly preferably equal to or greater than 60% by mass. The ink jet ink composition is an ink composition that is used in the ink jet recording method.

Further, the ink composition may or may not include an organic solvent, and the content of the organic solvent in the composition is preferably equal to or less than 30% by mass, is more preferably equal to or less than 25% by mass, and is particularly preferably equal to or less than 20% by mass with respect to 100% by mass of the composition.

Hereinafter, constituents that are or can be included in the water-based ink jet ink composition that forms the ink set according to the embodiment will be described separately for the color ink and for the clear ink.

1.2.1. Coloring Material

In the embodiment, the water-based ink jet ink composition includes coloring materials. Although either dyes or pigments can be used, pigments are preferably used since the pigments have properties that colors tend not to fade due to light, gas, and the like. Images formed on recording media using the pigments have not only excellent image quality but also excellent water resistance, gas resistance, light resistance, and the like and satisfactory preservation properties. These properties significantly appear in a case in which the images are formed on ink low-absorbable or non-absorbable recording media, in particular. Note that in the embodiment, the water-based ink jet ink and the dark ink composition may include the same coloring material or different coloring materials, respectively, in a case in which the water-based ink jet ink composition and the dark ink composition are used together.

Although pigments that can be used in the embodiment are not particularly restricted, examples thereof include inorganic pigments and organic pigments. As the inorganic pigments, titanium oxide, iron oxide, and carbon black manufactured by a known method such as a contact method, a furnace method, or a thermal method can be used. Meanwhile, as the organic pigments, it is possible to use an azo pigment, a polycyclic pigment, a nitro pigment, a nitroso pigment, aniline black, or the like, for example. Examples of the azo pigment include azo lake, an insoluble azo pigment, a condensed azo pigment, a chelate azo pigment, and the like. Examples of the polycyclic pigment include a phthalocyanine pigment, a perylene pigment, a perinone pigment, an anthraquinone pigment, a quinophthalone pigment, and the like.

From among the specific examples of the pigment that can be used in the embodiment, carbon black, for example, is exemplified as a pigment that can be used in black ink. Although carbon black is not particularly limited, examples thereof include furnace black, lamp black, acetylene black, or channel black (C.I. Pigment Black 7), and examples of commercially available products include No. 2300, 900, MCF88, No. 20B, No. 33, No. 40, No. 45, No. 52, MA7, MA8, MA77, MA100, No. 2200B and the like (all of which are names of products manufactured by Mitsubishi Chemical Corporation), Color Black FW1, FW2, FW2V, FW18, FW200, S150, S160, and S170, Pretex 35, U, V, and 140U, and Special Black 6, 5, 4A, 4, and 250 and the like (all of which are names of products manufactured by Degussa AG), Con ductex SC, and Raven 1255, 5750, 5250, 5000, 3500, 1255, and 700, and the like (all of which are names of products manufactured by Columbia Carbon), and Regal 400R, 330R, and 660R, Mogul L, and Monarch 700, 800, 880, 900, 1000, 1100, 1300, and 1400, Elftex 12, and the like (all of which are names of products manufactured by Cabot Japan K.K.).

Although a pigment that is used in white ink is not particularly limited, examples thereof include C.I. Pigment White 6, 18, and 21 and white inorganic pigment of titanium oxide, zinc oxide, zinc sulfide, antimony oxide, magnesium oxide, and zirconium oxide. A white organic pigment such as white hollow fine resin particles and polymer particles can also be used in addition to the white inorganic pigment.

Although a pigment used in yellow ink is not particularly limited, examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Although a pigment that is used in magenta ink is not particularly limited, examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50, and the like.

Although a pigment that is used in cyan ink is not particularly limited, examples thereof include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Although a pigment that is used in color ink other than magenta, cyan, and yellow ink is not particularly limited, and examples thereof include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

Although a pearl pigment is not particularly limited, examples thereof include a pigment that has pearly glossiness or interfering glossiness such as titanium dioxide-coated mica, fish scale foil, and bismuth chloride.

Although a metallic pigment is not particularly limited, examples thereof include particles of a monomer or an alloy of aluminum, silver, gold, platinum, nickel, chromium, tin, zinc, indium, titanium, copper, and the like.

The upper and lower limit values of the content of the coloring material that can be included in the water-based ink jet ink composition is preferably equal to or less than 1.5% by mass, may be preferably equal to or less than 1% by mass, may be equal to or less than 0.8% by mass, may be equal to or less than 0.6% by mass, and may be equal to or less than 0.5% by mass with respect to the total mass of the ink composition. Although the lower limit of the content is not limited, the lower limit of the content is preferably equal to or greater than 0.05% by mass, is more preferably equal to or greater than 0.1% by mass, and is further preferably equal to or greater than 0.3% by mass.

According to the water-based ink jet ink composition of the embodiment, it is possible to obtain, even in a region in which the amount of adhering ink is low, an image with excellent abrasion resistance and image quality that are equivalent to those in the other region, by using the resin with low reactivity, which will be described later. Although such an advantage can be achieved even if the water-based ink jet ink composition according to the embodiment is any of light cyan ink, light magenta ink, light yellow ink, light black ink, and the like, the advantage is significantly achieved with the light black ink using carbon black as a pigment, in particular, and it is also possible to obtain an image with excellent abrasion resistance and image quality even in the region in which the amount of adhering light ink is small.

In order to apply the aforementioned pigment to the ink composition, it is necessary for the pigment to be able to be stably dispersed and held in water. Examples of the method include a method of dispersing the pigment with dispersant resin such as water-soluble resin and/or water-dispersible resin (hereinafter, the pigment dispersed by this method will also be referred to as a "resin-dispersed pigment"), a method of dispersing the pigment with a surfactant such as a water-soluble surfactant and/or a water-dispersible surfactant (hereinafter, the pigment dispersed by this method will also be referred to as a "surfactant-dispersed pigment"), and a method of chemically/physically introducing a hydrophilic functional group to the surfaces of pigment particles to enable dispersion and/or dissolving of the pigment in water without using a dispersant such as a resin or a surfactant as described above (hereinafter, the pigment dispersed by this method will also be referred to as a "surface-processed pigment"). In the embodiment, any of the resin-dispersed pigment, the surfactant-dispersed pigment, and the surface-processed pigment can be used in the ink composition, and a plurality of types of resin can be mixed and used as needed.

Examples of the resin dispersant used in the resin-dispersed pigment includes polyvinyl alcohols, polyvinyl pyrrolidones, a polyacrylic acid, an acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, a styrene-maleic acid copolymer, a styrene-maleic anhydride copolymer, a vinylnaphthalene-acrylic acid copolymer, a vinylnaphthalene-maleic acid copolymer, a vinyl acetate-maleic acid ester copolymer, a vinyl acetate-crotonic acid copolymer, a vinyl acetate-acrylic acid copolymer, and the like and salts thereof. Among these examples, a copolymer of a monomer that has a hydrophobic functional group and a monomer that has a hydrophilic functional group and a polymer including a monomer that has both a hydrophobic functional group and a hydrophilic functional group are particularly preferably used. As a form of the copolymer, the copolymer may be used in any form of a random copolymer, a block copolymer, an alternate copolymer, and a graft copolymer.

Examples of the aforementioned salt include salts with a basic compound such as ammonia, ethylamine, diethylamine, triethylamine, propylamine, isopropylamine, dipropylamine, butylamine, isobutylamine, dethanolamine, triethanolamine, tri-iso-propanolamine, aminomethylpropanol, or a morpholine. The amount of addition of these basic compounds is not particularly limited as long as the amount is equal to or greater than the neutralization equivalent of the aforementioned resin dispersant.

As for the molecular weight of the aforementioned resin dispersant, the weight average molecular weight is preferably within a range of equal to or greater than 1,000 and equal to or less than 100,000 and is more preferably within a range of equal to or greater than 3,000 and equal to or less than 10,000. If the molecular weight falls within the aforementioned range, stable dispersion of the pigment in water is achieved, and viscosity control and the like can easily be performed when the pigment is applied to the ink composition.

As the aforementioned resin dispersant, a commercially available product can also be used. Specific examples include Joncryl 67 (weight average molecular weight: 12,500, acid value: 213), Joncryl 678 (weight average molecular weight: 8,500, acid value: 215), Joncryl 586 (weight average molecular weight: 4,600, acid value: 108), Joncryl 611 (weight average molecular weight: 8,100, acid value: 53), Joncryl 680 (weight average molecular weight: 4,900, acid value: 215), Joncryl 682 (weight average molecular weight: 1,700, acid value: 238), Joncryl 683 (weight average molecular weight: 8,000, acid value: 160), and Joncryl 690 (weight average molecular weight: 16,500, acid value: 240) (all of which are names of products manufactured by BASF Japan) and the like.

Examples of the surfactant used in the surfactant-dispersed pigment include anionic surfactants such as alkane sulfonate, α-olefin sulfonate, alkyl benzene sulfonate, alkyl naphthalene sulfonate, acyl methyl taurate, dialkyl sulfosuccinate, an alkyl sulfate ester salt, sulfated olefin, a polyoxyethylene alkyl ether sulfate ester salt, an alkyl phosphate ester salt, a polyoxyethylene alkyl ether phosphate ester salt, and a monoglyceride phosphate ester salt, amphoteric surfactants such as an alkyl pyridinium salt, an alkyl amino salt, and alkyl dimethyl betaine, and nonionic surfactants such as polyoxyethylene alkyl ether, polyoxyethylene alkyl phenyl ether, polyoxyethylene alkyl ester, polyoxyethylene alky amide, glycerin alkyl ester, and sorbitan allyl ester.

The amount of addition of the aforementioned resin dispersant or the aforementioned surfactant with respect to the pigment is preferably equal to or greater than 1 parts by mass and equal to or less than 100 parts by mass and is more preferably equal to or greater than 5 parts by mass and equal to or less than 50 parts by mass with respect to 100 parts by mass of the pigment. If the amount of addition falls within the range, it is possible to secure dispersion stability of the pigment in water.

Examples of the hydrophilic functional group in the surface-processed pigment include —OM, —COOM, —CO—, —SO$_2$NH$_3$, —RSO$_3$M, —PO$_3$HM, —PO$_3$M$_3$, —SO$_3$NHCOR, —NH$_3$, —NR$_3$ (where M in formulae represents a hydrogen atom, alkali metal, ammonium, or organic ammonium, and R represents an alkyl group having 1 to 12 carbon atoms, a phenyl group that may have a substituent, or a naphthyl group that may have a substituent), and the like. These functional groups are physically and/or chemically introduced by being grafted to the surfaces of the pigment particles directly and/or via another group. Examples of the polyvalent group include an alkylene group having 1 to 12 carbon atoms, a phenylene group that may have a substituent, a naphthylene group that may have a substituent, and the like.

As the aforementioned surface-processed pigment, a pigment that has been surface-processed such that —SO$_3$M and/or —RSO$_3$M (M is a counterion and represents a hydrogen ion, an alkali metal ion, an ammonium ion, or an organic ammonium ion) is chemically bonded to the surfaces of the pigment particles with a processing agent including sulfur, that is, a pigment that is obtained by dispersing the pigment in a pigment insoluble or slightly soluble solvent in which the pigment does not have an active proton and does not exhibit reactivity with a sulfonic acid and then performing surface processing such that —SO$_3$M and/or —RSO$_3$M is chemically bonded to the surfaces of particles with an amidesulphuric acid or a complex of sulfur trioxide and tertiary amine and the resin can be dispersed and/or dissolved in water.

As a surface processing mechanism of grafting the functional groups or salts thereof to the surfaces of the pigment particles directly or via a polyvalent group, various known surface processing mechanisms can be applied. Although examples thereof include a mechanism of causing ozone or a sodium hypochlorite solution to act on commercially available oxidized carbon black and further performing oxidation processing on the carbon black such that the surface is processed to be more hydrophilic (for example, JP-A-7-258578, JP-A-8-3498, JP-A-10-120958, JP-A-10-195331, and JP-A-10-237349), a mechanism of processing carbon black with 3-amino-N-alkyl-substituted pyridinium bromide (for example, JP-A-10-195360 and JP-A-10-330665), a mechanism of dispersing an organic pigment in a solvent in which the organic pigment is insoluble or slightly soluble and introducing a sulfone group into the surfaces of the pigment particles with a sulfonating agent (for example, JP-A-8-283596, JP-A-10-110110, and JP-A-10-110111), a mechanism of dispersing an organic pigment in a basic solvent that forms a complex with sulfur trioxide, processing the surfaces of the organic pigment by adding the sulfur trioxide, and introducing a sulfone group or a sulfone amino group (for example, JP-A-10-110114), and the like, the mechanism of producing the surface-processed pigment used in the invention is not limited to these mechanisms.

A single functional group or a plurality of types of functional groups may be grafted to one pigment particle. The types and the degrees of the functional groups to be grafted may be appropriately decided in consideration of dispersion stability in the ink, a color density, drying properties on an ink jet head surface, and the like.

As method of dispersing the resin-dispersed pigment, the surfactant-dispersed pigment, and the surface-processed pigment as described above in water, the dispersion can be performed by adding a pigment, water, and a resin dispersant for the resin-dispersed pigment, a pigment, water, and a surfactant for the surfactant-dispersed pigment, a surface-processed pigment and water for the surface-processed pigment, adding a water-soluble organic solvent, a neutralizer, and the like as needed, and using a dispersing machine that is used in the related art, such as a ball mill, a sand mill, an attritor, a roll mill, an agitator mill, a Henschel mixer, a colloid mill, an ultrasonic homogenizer, a jet mill, or an angmill. In this case, it is preferable to disperse the pigment until the volume average particle diameter falls within a range of equal to or greater than 20 nm and equal to or less than 500 nm, more preferably falls within a range of equal to or greater than 50 nm and equal to or less than 200 nm in terms of particle diameters of the pigment in order to secure dispersion stability of the pigment in water.

In a case in which the water-based ink jet ink composition includes the pigment, the pigment is preferably a pigment with which a change in a volume average particle diameter of the pigment after mixing a water-mediated solution of the pigment and a 0.3M magnesium sulfate aqueous solution is greater than three times as large as that before the mixing. The change in the particle diameter is measured by a method of measuring a change in the particle diameter of the resin, which will be described later, by replacing the water-mediated solution of the resin with a water-mediated solution of the resin, and a pigment dispersant or the like that is used to adjust ink is used. The ratio of the mixed particle diameters of the pigment is preferably equal to or greater than four times and is further preferably equal to or greater than five times. Although the upper limit thereof is not limited, the upper limit is equal to or less than thirty times, for example.

1.2.2. Resin

In the embodiment, the water-based ink jet ink composition contains resin, and a change in the volume average particle diameter of the resin after mixing a water-mediated solution of the resin and a 0.3M magnesium sulfate aqueous solution is equal to or less than three times as large as that before the mixing (also simply referred to as "a change in the particle diameter").

The change in the particle diameter is measured as follows.

A water-mediated solution of the resin that is used to prepare ink or the like is prepared. The water-mediated solution of the resin is a resin emulsion solution or the like, for example. Here, in a case in which the content of the resin in the water-mediated solution of the resin is equal to or greater than 1% by mass, a water-mediated solution containing 1% by mass of resin is obtained by diluting the water-mediated solution with pure water. In a case in which the content of the resin in the water-mediated solution of the resin is less than 1% by mass, the water-mediated solution is used as it is. If the thus obtained water-mediated solution of the resin contains 1% by mass of resin, the water-mediated solution of the resin and the 0.3M magnesium sulfate aqueous solution are mixed at a mass ratio of 1:1. If the thus obtained water-mediated solution of the resin contains less than 1% by mass of resin, the water-mediated solution of the resin and the 0.3M magnesium sulfate aqueous solution are mixed at a mass ratio of 1:X, where X represents % by mass of the resin. The mixing ratio is set in this manner. Note that the 0.3M magnesium sulfate aqueous solution to be mixed with the water-mediated solution of the resin will also be referred to as a test solution.

The obtained mixture solution is stirred. The stirring is performed such that the entire mixture solution flows, and for example, the stirring is performed for about 10 seconds using a magnetic stirrer until the liquid surface of the mixture solution is formed into a mortar shape. The volume average particle diameter of the resin in the mixture solution after the stirring and the volume average particle diameter of the resin in the resin water dispersion before the mixing are measured. Then, the volume average particle diameter before the mixing/the volume average particle diameter after the mixing=a change in particle diameter is obtained. Note that the aforementioned mixing, stirring, and measurement are respectively performed at the room temperature (25° C.)

The volume average particle diameter can be measured by a particle size distribution measurement apparatus that uses a dynamic light scattering theory as a measurement principle. Examples of such a particle size distribution measurement apparatus include "Microtrac UPA" manufactured by Nikkiso Co., Ltd.

Since the resin has effects of solidifying the ink composition and further firmly fixing the ink solid on the recording medium by reacting with the processing solution and being coagulated, an image with excellent abrasion resistance and image quality is obtained. Meanwhile, in a case in which an image is formed using the light ink composition that contains a small amount of coloring material, filling with the ink may be inferior even if the resin is included, abrasion resistance and glossiness may be degraded in a case in which the amount of adhering ink is small, and a glossiness difference may occur on the image.

According to the embodiment, an image with excellent abrasion resistance and image quality that are equivalent to those in the other region is obtained even in a case in which the image is formed with a small amount of adhesion using the ink composition that contains a small amount of coloring material by the change in the volume average particle diameter of the resin contained in the water-based ink jet ink composition after mixing the water-mediated solution of the resin and the 0.3M magnesium sulfate aqueous solution being equal to or less than three times as large as that before the mixing in the environment at 25° C. The advantage can highly be achieved in a case in which recording is performed on a low-absorbable recording medium or a non-absorbable recording medium, in particular, and the advantage can highly be obtained for a recording medium made of vinyl chloride with high surface tension, for example. Note that the volume average particle diameter after the mixing of the resin is more preferably equal to or less than 2 times, is further preferably equal to or less than 1.5 times, and is particularly preferably equal to or less than 1.3 times. Although the lower limit thereof is not limited, the volume average particle diameter may not change before and after the mixing, or the lower limit may be equal to or greater than 0.8 times, may be equal to or greater than 1.0 times, or may be equal to or greater than 1.1 times.

As the resin with such a relatively low increase rate of the volume average particle diameter, resin that is less coagulated with magnesium sulfate included in the test solution may be used. Examples of such resin include fine resin particles of an emulsifier dispersion type, and/or preferable examples thereof include resin with a low acid value measured by a potential difference measurement method based on JIS-K2501. Resin with an acid value of equal to or less than 10 mgKOH/g is more preferably used, and resin with an acid value of equal to or less than 5 mgKOH/g is further preferably used. The lower limit of the acid value may be 0 mgKOH/g.

In the embodiment, the resin may be in either a state in which the resin is dissolved in the ink composition or a state in which the resin is dispersed in the ink composition, and the water-mediated solution means a water dispersion, an aqueous solution, or the like. As the resin in the dissolved state, the aforementioned resin dispersant that is used in a case in which the pigment of the water-based ink jet ink composition is dispersed can be used. Also, as the resin in the dispersed state, it is possible to include resin by dispersing resin that is slightly soluble or insoluble in a liquid medium of the water-based ink jet ink composition in the form of fine particles, that is, in an emulsion state or a suspension state.

In order to set the increase rate of the volume average particle diameter of the resin within the aforementioned range, the amount of used emulsifier is increased when the fine resin particles of the emulsifier dispersion type are used to cause emulsion dispersion, for example.

Although the resin used in the embodiment is not particularly limited as long as the resin is resin with low reactivity in which the volume average particle diameter after a water-mediated solution containing 1% by mass of resin and a 0.3M magnesium sulfate aqueous solution are mixed at a mass ratio of 1:1 with respect to that before the mixing is equal to or less than 3 times, examples thereof include urethane-based resin, acrylic resin, styrene-acrylic resin, fluorene-based resin, polyolefin-based resin, rosin-modified resin, terpene-based resin, polyester-based resin, polyamide-based resin, epoxy-based resin, vinyl chloride-based resin, a vinyl chloride-vinyl acetate copolymer, ethylene vinyl acetate, and the like. Although such resin is handled in the form of emulsion in many cases, the resin may have powder characteristics. Also, one kind of resin may be used alone, or two or more kinds of resin may be used in combination. In the embodiment, the urethane-based resin or the acrylic resin are preferably used as the resin with low reactivity from among the aforementioned resin.

The urethane-based resin is a name collectively referring to resin that has a urethane bond. As the urethane-based resin, polyether-type urethane resin that includes an ether bond at a main chain, a polyester-type urethane resin that includes an ester bond at a main chain, a polycarbonate-type urethane resin that includes a carbonate bond at a main chain, or the like instead of the urethane bond may be used. A commercially available product may be used as the urethane-based resin, examples of the commercially available product that may be used include Superflex 460, 460s, 840, and E-4000 (names of products manufactured by DKS Co., Ltd.), Resamine D-1060, D-2020, D-4080, D-4200, D-6300, and D-6455 (names of products manufactured by Dainichiseika Color & Chemicals Mfg. Co., Ltd.), Takelac WS-6021 and W-512-A-6 (names of products manufactured by Mitsui Chemicals Polyurethanes Inc.) Sun Cure 2710 (name of product manufactured by The Lubrizol Corporation), Permarin UA-150 (name of product manufactured by Sanyo Chemical Industries, Ltd.), and the like.

The acrylic resin is a name that collectively refers to polymers that can be obtained by polymerizing at least an acrylic monomer such as (methacrylic acid or (meth)acrylic acid ester, and examples thereof (meth)acrylic resin obtained from an acrylic monomer, a copolymer of an acrylic monomer and another monomer (for example, a vinyl-based monomer such as styrene), and the like. As the acrylic monomer, acrylamide, acrylonitrile, or the like can also be used. A commercially available product may also be used as a resin emulsion that includes the acrylic resin as an ingredient, and examples thereof include FK-854 (name of product manufactured by Chirika Co., Ltd.), Mowinyl 952B and 718A (name of product manufactured by Nippon Synthetic Chemical Industry Co., Ltd.), Nipol LX852 and LX874 (name of product manufactured by Zeon Corporation), and the like.

Note that in the specification, the acrylic resin may include styrene-acrylic resin, which will be described later. In the specification, representation of (meth)acryl means at least either acryl or methacryl.

The styrene-acrylic resin is a copolymer that is obtained from a styrene monomer and acrylic monomer, and examples thereof include a styrene-acrylic acid copolymer, a styrene-methacrylic acid copolymer, a styrene-methacrylic acid-acrylic acid ester copolymer, a styrene-α-methylstyrene-acrylic acid copolymer, styrene-α-methylstyrene-acrylic acid ester copolymer, and the like. A commercially available product may also be used as the styrene-acrylic resin, and examples thereof include Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (names of products manufactured by BASF Japan), Mowinyl 966A and 975N (names of products manufactured by Nippon Synthetic Chemical Industry Co., Ltd.), Vinyblan 2586 (name of product manufactured by Nisshin Chemical Co., Ltd.), and the like.

The polyolefin-based resin has olefin such as ethylene, propylene, or butylene in a structure skeleton, and known polyolefin-based resin can appropriately be selected and used. A commercially available product can be used as the olefin resin, and examples thereof include Arrow Base CB-1200 and CD-1200 (name of product manufactured by Unitika Ltd.) and the like.

In order to obtain the aforementioned resin in the fine particle state, the resin can be obtained by the methods described below, any of the methods may be used, and a plurality of methods may be combined as needed. The methods include a method of mixing a polymerization catalyst (polymerization initiator) and a dispersant in a monomer that forms desired resin, that is, emulsion-polymerizing the polymerization catalyst and the dispersant, a method of dissolving resin that has a hydrophilic part in a water-soluble organic solvent, mixing the solution in water, then removing the water-soluble organic solvent through distillation or the like, thereby obtaining the resin, a method of dissolving resin in a non-water-soluble organic solvent, and mixing the solution in an aqueous solution along with a dispersant, thereby obtaining the resin, and the like. The aforementioned methods can appropriately be selected in accordance with the type and characteristics of the used resin. Although the dispersant that can be used to disperse the resin is not particularly limited, examples thereof that can be used include anionic surfactant such as a salt of sodium dodecylbenzenesulfonate, a salt of sodium lauryl phosphate, a salt of polyoxyethylene alkyl ether sulfate ammonium, and for example, nonionic surfactant such as polyoxyethylene alkyl ether, poyoxyethylene alkyl ester, polyoxyethylene sorbitan fatty acid ester, and polyoxyethylene alkyl phenyl ether, and one kind of the dispersant can be used alone, or two or more kinds of the dispersant can be mixed and used.

In a case in which the aforementioned resin is used in a fine particle state such as an emulsion state or a suspension state, it is possible to use the resin that can be obtained by known materials and a known method. For example, the resin described in JP-B-62-1426, JP-A-3-56573, JP-A-3-79678, JP-A-3-160068, JP-A-4-18462, and the like may be used.

The resin may be supplied in the form of an emulsion, and examples of a commercially available product of such a resin emulsion include MicroGel E-1002 and E-5002 (all of which are names of products manufactured by Nipponpaint Co., Ltd.; styrene-acrylic resin emulsion), Voncoat 4001 (which is a name of a product manufactured by DIC Corporation; acrylic resin emulsion), Voncoat 5454 (which is a name of a product manufactured by DIC Corporation;

styrene-acrylic resin emulsion), Polysol AM-710, AM-920, AM-2300, AP-4735, AT-860, and PSASE-4210E (acrylic resin emulsion), Polysol AP-7020 (styrene-acrylic resin emulsion), Polysol SH-502 (vinyl acetate-resin emulsion), Polysol AD-13, AD-2, AD-10, AD-96, AD-17, and AD-70 (ethylene-vinyl acetate resin emulsion), Polysol PSASE-6010 (ethylene-vinyl acetate resin emulsion) (all of which are names of products manufactured by Showa Denko K. K.), Polysol SAE 1014 (which is a name of a product manufactured by Zeon Corporation; styrene-acrylic resin emulsion), Saibinol SK-200 (which is a name of a product manufactured by Saiden Chemical Industry Co., Ltd.; acrylic resin emulsion), AE-120A (which is a name of a product manufactured by JSR Corporation; acrylic resin emulsion), AE373D (which is a name of a product manufactured by Emulsion Technology Co., Ltd.; carboxy-modified styrene-acrylic resin emulsion), Seikadain 1900W (which is a name of a product manufactured by Dainichiseika Color & Chemicals Mfg. Co., Ltd.; ethylene-vinyl acetate resin emulsion), Vinyblan 2682 (acrylic resin emulsion), Vinyblan 2886 (vinyl acetate-acrylic resin emulsion), Vinyblan 5202 (acrylic acetate resin emulsion), (which is a name of a product manufactured by Nisshin Chemical Co., Ltd.), Elitel KA-5071S, KT-8803, KT-9204, KT-8701, KT-8904, and KT-0507 (all of which are names of products manufactured by Unitika Ltd.; polyester resin emulsion), Hi-Tech SN-2002 (which is a name of a product manufactured by Toho Chemical Industry Co., Ltd.; polyester resin emulsion), Takelac W-6020, W-635, W-6061, W-605, W-635, and W-6021 (all of which are names of products manufactured by Mitsui Chemicals Polyurethanes Inc.; urethane-based resin emulsion), Superflex 870, 800, 150, 420, 460, 470, 610, and 700 (all of which are names of products manufactured by DKS Co., Ltd.; urethane-based resin emulsion), Permarin UA-150 (name of product manufactured by Sanyo Chemical Industries, Ltd.; urethane-based resin emulsion), Sun Cure 2710 (name of product manufactured by The Lubrizol Corporation; urethane-based resin emulsion), NeoRez R-9660, R-9637, and R-940 (all of which are names of products manufactured by Kusumoto Chemicals, Ltd.; urethane-based resin emulsion), Adekabontiter HUX-380, 290K (all of which are names of products manufactured by ADEKA; urethane-based resin emulsion), Mowinyl 966A and Mowinyl 7320 (all of which are names of products manufactured by Nippon Synthetic Chemical Industry Co., Ltd.), Joncryl 7100, 390, 711, 511, 7001, 632, 741, 450, 840, 74j, HRC-1645J, 734, 852, 7600, 775, 537J, 1535, PDX-7630A, 352J, 352D, PDX-7145, 538J, 7640, 7641, 631, 790, 780, and 7610 (all of which are names of products manufactured by BASF Japan), NK binder R-5HN (which is a name of a product manufactured by Shin-Nakamura Chemical Co., Ltd.), Hydran WLS-210 (which is a name of a product manufactured by DIC Corporation; non-crosslinked polyurethane), Joncryl 7610 (which is a name of a product manufactured by BASF Japan), and the like.

The resin may include composite resin. The composite resin is formed of two or more kinds of resin with mutually different configurations of monomer constituents that form the resin, namely, at least either resin of different kinds or resin with different content ratios regardless of which parts of the resin the two or more kinds of resin forms. The two or more kinds of resin are not limited to resin that can be distinguished at discontinuous configurations of the resin at the boundary therebetween and may be resin with continuously different configurations of the monomer constituents.

In the case in which the resin is used in the fine particle state, the volume average particle diameter is preferably within a range of equal to or greater than 5 nm and equal to or less than 400 nm and is more preferably within a range of equal to or greater than 50 nm and equal to or less than 200 nm from the viewpoint of securing preservation stability and ejection reliability of the ink composition. If the volume average particle diameter of the fine resin particles fall within the aforementioned range, excellent film formation properties are achieved, large lumps tend not to be generated even if the particles are coagulated, and it is thus possible to reduce clogging of the nozzles. Note that the volume average particle diameter in the specification can be measured by a granular size distribution measurement device that employs a dynamic light scattering theory as a measurement principle, for example. Examples of such a granular size distribution measurement device include "Microtrac UPA" manufactured by Nikkiso Co., Ltd.

The glass transition temperature (Tg) of the resin is preferably equal to or greater than −20° C. and equal to or less than 100° C., is more preferably equal to or greater than −10° C. and equal to or less than 80° C., and is further preferably equal to or greater than 0° C. and equal to or less than 76° C., for example.

The lower limit value of the total content of the resin is preferably equal to or greater than 2% by mass, is more preferably equal to or greater than 3% by mass, and is further preferably equal to or greater than 4% by mass with respect to the total mass of the ink composition in terms of solid content. The upper limit of the content of the resin is preferably equal to or less than 15% by mass, is more preferably equal to or less than 10% by mass, is further preferably equal to or less than 7% by mass, and is particularly preferably equal to or less than 5% by mass with respect to the total mass of the ink composition. If the content of the resin falls within the aforementioned range, it is possible to secure clogging resistance during recording and to form an image with excellent image quality and abrasion resistance even on the ink low-absorbable or non-absorbable recording medium, in particular.

1.2.3. Organic Solvent

In the embodiment, the water-based ink jet ink composition preferably contains an organic solvent. It is possible to obtain excellent clogging resistance during recording, to obtain satisfactory drying properties of the water-based ink jet ink composition ejected onto the recording medium, and to obtain an image with excellent image quality and abrasion resistance by the water-based ink jet ink composition containing the organic solvent.

As the organic solvent used in the water-based ink jet ink composition, a water-soluble organic solvent is preferably used. It is possible to obtain more satisfactory drying properties of the ink composition and to obtain an image with excellent image quality and abrasion resistance by using the water-soluble organic solvent.

Although the water-soluble organic solvent is not particularly limited, examples thereof include alkanediols, polyols, a nitrogen-containing solvent, esters, glycol ethers, cyclic esters, and the like.

Examples of alkanediols include 1,2-pentanediol, 1,2-hexanediol, 1,2-octanediol, and the like that are 1,2-alkanediols, 1,6-hexanediol, and the like. One kind of alkanediols may be used alone, or two or more kinds of alkanediols may be used in combination. The alkanediols have an excellent effect of enhancing wettability of the ink composition with respect to the recording medium and uniformly wetting the recording medium or an excellent effect as a penetrating solvent for the recording medium. Among these examples, 1,2-alkanediols, in particular, have an excellent effect as a penetrating solvent, and are preferably used. Preferable examples of alkanediols include diol of alkane having 5 or more carbon atoms. The number of carbon atoms of alkane is preferably from 5 to 9, and either a linear type or a branched type may be used.

Examples of polyols include ethylene glycol, propylene glycol, 1,2-propanediol, 1,3-propanediol, 1,2-butandiol, 1,4-butandiol, diethylene glycol, triethylene glycol, dipropyrene glycol, 2-ethyl-2-methyl-1,3-propandiol, 2-methyl-2-propyl-1,3-propandiol, 2-methyl-1,3-propandiol, 2,2-dimethyl-1,3-propandiol, 3-methyl-1,3-butandiol, 2-ethyl-1,3-hexandiol, 3-methyl-1,5-pantandiol, 2-methypentan-2,4-diol, trimethylolpropane, glycerin, and the like. One kind of polyols may be used alone, or two or more kinds of polyols may be mixed and used. The polyols have an excellent effect as a moisturizer. Examples of polyols include alkane preferably having 4 or less carbon atoms that have two or more hydroxyl groups and alkane having 4 or less carbon atoms that have two or more hydroxyl groups in which the hydroxyl groups have caused inter-molecular condensations. The number of condensations is preferably two to four. Here, polyols are compounds that have two or more hydroxyl groups in a molecule, and in the embodiment, the number of hydroxyl groups is preferably two or three.

Examples of the nitrogen-containing solvent include pyrrolidones such as N-methyl-2-pyrrolidon, N-ethyl-2-pyrrolidon, N-vinyl-2-pyrrolidon, 2-pyrrolidon, N-butyl-2-pyrrolidon, 5-methyl-2-pyrrolidon, and the like. One kind of the nitrogen-containing solvents may be used alone or two or more kinds of the nitrogen-containing solvents may be mixed and used. The nitrogen-containing solvent acts as a satisfactory dissolving agent for resin, and it is possible to obtain a recorded product with excellent abrasion resistance and to prevent clogging of the ink jet head and the nozzles.

Examples of the nitrogen-containing solvent include alkoxy alkyl amides, and examples thereof include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethypropionamide, 3-n-propoxy-N,N-methyethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and the like.

Examples of the nitrogen-containing solvent also include an amide-based solvent. Preferable examples of the amide-based solvent include a cyclic amide-based solvent and a non-cyclic amide-based solvent. Examples of the cyclic amide-based solvent include the aforementioned pyrrolidones. Examples of the non-cyclic amide-based solvent include the aforementioned alkoxy alkyl amides.

The content of the nitrogen-containing solvent with respect to the ink composition is preferably equal to or greater than 3% by mass and equal to or less than 30% by mass, is more preferably equal to or greater than 5% by mass and equal to or less than 25% by mass, and is preferably equal to or greater than 10% by mass and equal to or less than 20% by mass. In this case, excellent abrasion resistance, image quality, and the like are achieved, which is preferable. The content of the amide-based solvent as the nitrogen-containing solvent with respect to the ink within the aforementioned range is preferable in terms of the aforementioned points.

Examples of esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propyrene glycol monomethyl ether acetate, dipropylene glycol monomethyl ether acetate, and methoxybutyl acetate, and glycol diesters such as ethylene glycol diacetate, diethylene glycol diacetate, propylene glycol diacetate, dipropylene glycol diacetate, ethylene glycol acetate propionate, ethylene glycol acetate butylate, dietylene glycol acetate butylate, diethylene glycol acetate propionate, diethylene glycol acetate butylate, propylene glycol acetate propionate, propylene glycol acetate butylate, dipropylene glycol acetate butylate, and dipropylene glycol acetate propionate.

As glycol ethers, monoether or diether of alyklene glycol may be used, and alkyl ether is preferably used. Specific examples include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol ethyl ether, triethylene glycol dibutyl ether, triethylene glycol methyl butyl ether, tetraethylee glycol dimethyl ether, tetraethylene glycol dethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether. These can control wettability and the like of the ink composition with respect to the recording medium.

As for aforementioned alkylene glycol, diether tends to dissolve or swell the resin particles in the ink composition than monoether, and diether is preferable from a viewpoint of improving abrasion resistance of the formed image.

Examples of the cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone, and compounds obtained by substituting hydrogen of a methylene group that is adjacent to a carbonyl group therein with an alkyl group having 1 to 4 carbon atoms.

The content of the organic solvent is preferably equal to or greater than 1% by mass, is more preferably equal to or greater than 5% by mass, and is further preferably equal to or greater than 10% by mass with respect to the total mass of the ink composition. The content of the organic solvent is preferably equal to or less than 40% by mass, is more preferably equal to or less than 35% by mass, and is further preferably equal to or less than 30% by mass with respect to the total mass of the ink composition. In a case in which the content of the organic solvent falls within the aforementioned range, the ink composition has more excellent clogging resistance and abrasion resistance, which is preferable.

The standard boiling point of the organic solvent is equal to or greater than 180° C., is more preferably equal to or greater than 200° C., and is further preferably equal to or greater than 210° C. The standard boiling point of the organic solvent is preferably equal to or less than 300° C., is more preferably equal to or less than 270° C., and is further preferably equal to or less than 250° C. In a case in which the standard boiling point of the organic solvent falls within the aforementioned range, the ink composition has more excellent clogging resistance and abrasion resistance, which is preferable.

Note that the polyols with a standard boiling point of equal to or greater than 280° C., such as triethylene glycol or glycerin, functions as a moisturizer, the drying of the ink jet head is suppressed, and ejection is stabilized if the polyols are contained. Meanwhile, the polyols with the standard boiling point of equal to or greater than 280° C. may absorb moisture of the ink composition, increase viscosity of the ink near the ink jet head, and degrade drying properties of the ink when the polyols adhere to the recording medium. Therefore, the content of the polyols with the standard boiling point of equal to or greater than 280° C. in the water-based ink jet ink composition is preferably equal to or less than 3% by mass, is more preferably equal to or less than 2% by mass, is more preferably equal to or less than 1% by mass, is further preferably equal to or less than 0.8% by mass, and is particularly preferably equal to or less than 0.1% by mass with respect to the total mass of the ink composition in the embodiment. In this case, since the drying properties of the ink composition on the recording medium increase, the ink composition is suitable for performing recording on a low-absorbable recording medium or a non-absorbable recording medium, in particular, and an image with excellent abrasion resistance is obtained.

Further, the content of the organic solvent (not limited to polyols) with the standard boiling point of equal to or greater than 280° C. in the water-based ink jet ink composition preferably falls within the aforementioned range in terms of the aforementioned points.

1.2.4. Water

In the embodiment, the water-based ink jet ink composition contains water. Water is a main medium of the water-based ink jet ink composition and is a constituent that evaporates and flies by being dried. Water is preferably pure water such as ion exchanged water, ultrafiltration water, reverse osmosis water, or distilled water or water from which ionic impurities have been removed as much as possible such as ultrapure water is preferably used. Water sterilized by ultraviolet irradiation, addition of hydrogen peroxide, or the like is preferably used since it is possible to prevent mold and bacteria from being generated in a case in which the ink composition is stored for a long period of time.

The content of water is preferably equal to or greater than 40% by mass, is more preferably equal to or greater than 50% by mass, and is further preferably equal to or greater than 60% by mass with respect to the total mass of the water-based ink jet ink composition.

1.2.5. Surfactant

In the embodiment, the water-based ink jet ink composition preferably contains a surfactant. Although the surfactant is not particularly limited, examples thereof include an acetylene glycol-based surfactant, a fluorine-based surfactant, and a silicone-based surfactant, at least one kind of them is preferably contained, and the silicone-based surfactant and the fluorine-based surfactant are more preferably contained from among them. If the ink contains the silicone-based surfactant and the fluorine-based surfactant, dynamic surface tension of the ink decreases, and it is possible to improve clogging resistance.

Although the acetylene glycol-based surfactant is not particularly limited, examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all of which are names of products manufactured by Air Products and Chemicals, Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all of which are names of products manufactured by Nisshin Chemical Co., Ltd.), and Acetylenol E00, E00P, E40, and E100 (all of which are names of products manufactured by Kawaken Fine Chemicals Co., Ltd.).

Although the silicon-based surfactant is not particularly limited, preferable examples include a polysiloxane compound. Although the polysiloxane-based compound is not particularly limited, examples thereof include polyether-modified organosiloxane. Examples of commercially available products of the polyether-modified organosiloxane include BYK-306, BYK-307, BYK-333, BYK-341, BYK-345, BYK-346, and BYK-348 (all of which are names of products manufactured by BYK Additives & Instruments), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all of which are names of products manufactured by Shin-Etsu Chemical Co., Ltd.).

A fluorine-modified polymer is preferably used as the fluorine-based surfactant, and specific examples thereof include BYK-340 (name of product manufactured by BYK Additives & Instruments).

In the case in which the surfactant is contained, the content can be preferably equal to or greater than 0.1% by mass and equal to or less than 1.5% by mass and is preferably equal to or greater than 0.5% by mass and equal to or less than 1% by mass with respect to the total mass of the ink composition.

1.2.6. Other Constituents to be Contained

In the embodiment, it is also possible to appropriately add, to the water-based ink jet ink composition, various additives such as an antifoaming agent, a solubilizer, a viscosity adjuster, a pH adjuster, a polyolefin wax, an antioxidant, an antiseptic, a fungicide, a corrosion inhibitor, a moisturizer that is not an organic solvent, a chelating agent for capturing a metal ion that affects dispersion, and the like in order to satisfactorily maintain preservation stability and ejection stability of the ink jet head, in order to solve clogging, or in order to prevent the ink from being degraded.

Examples of the pH adjuster include potassium dihydrogen phosphate, sodium dihydrogen phosphate, sodium hydroxide, lithium hydroxide, potassium hydroxide, ammonia, diethanolamine, triethanolamine, trisopropanolamine, potassium carbonate, sodium carbonate, sodium hydrogen carbonate, and the like.

Examples of the polyolefin wax include a wax manufactured by olefin such as ethylene, propylene, or butylene or derivatives thereof, and a copolymer thereof, and specific examples thereof include a polyethylene-based wax, a polypropylene-based wax, a polybutylene-based wax, and the like. A commercially available product can be used as the polyolefin wax, and specific examples thereof that can be used include Nopcoat PEM17 (which is a name of a product manufactured by San Nopco Limited), Chemipearl W4005 (which is a name of a product manufactured by Mitsui Chemicals, Inc.), AQUACER 515 and AQUACER 593 (all of which are names of products manufactured by BYK Additives & Instruments), and the like.

If the polyolefin wax is added, it is possible to improve wettability of the image formed on the ink non-absorbable or low-absorbable recording medium with respect to physical contact and to improve abrasion resistance of the image, which is preferable. The content of the polyolefin wax is preferably equal to or greater than 0.01% by mass and equal to or less than 10% by mass and is more preferably equal to or greater than 0.05% by mass and equal to or less than 1% by mass with respect to the total mass of the ink composition. If the content of the polyolefin wax falls within the aforementioned range, the aforementioned advantages are sufficiently exhibited.

Examples of antiseptic and fungicide include sodium benzoate, sodium pentachlorophenol, 2-pyridinethiol-1-oxide sodium, sodium sorbate, sodium dehydroacetate, 1,2-dibenzoisothiazoline-3-one, and the like. Examples of a commercially available product include Proxel XL2 and Proxel GXL (all of which are names of products manufactured by Avecia Ltd.), Denicide CSA and NS-500W (which is a name of a product manufactured by Nagase ChemteX Corporation), and the like.

Examples of the anti-rust agent include benzotriazole and the like.

Examples of the chelating agent include ethylenediaminetetraacetic acid and salts thereof (a disodium dihyrogen ethylenediaminetetraacetate salt and the like).

Examples of the moisturizer that is not an organic solvent include a moisturizer that is solid at an ordinary temperature, such as trimethylolpropane and sugar.

1.2.7. Preparation Method of Water-Based Ink Jet Ink Composition

In the embodiment, the water-based ink jet ink composition and the clear ink are obtained by mixing the aforementioned constituents in any order and performing filtration as needed to remove impurities. As a method of mixing the respective constituents, a method of adding materials in order in a container provided with a stirring device, such as a mechanical stirrer or a magnetic stirrer and stirring and mixing the materials therein is preferably used. As a filtration method, centrifugal filtration, filter filtration, or the like can be performed as needed.

1.2.8. Physical Properties of Water-Based Ink Jet Ink Composition

In the embodiment, the surface tension of the water-based ink jet ink composition at 20° C. is preferably equal to or greater than 18 mN/m and equal to or less than 40 mN/m, is more preferably equal to or greater than 20 mN/m and equal to or less than 35 mN/m, and is further preferably equal to or greater than 22 mN/m and equal to or less than 33 mN/m from the viewpoint of balance between image quality and reliability as ink for ink jet recording. For measuring the surface tension, it is possible to perform the measurement by checking the surface tension when a platinum plate is wetted with the ink in an environment at 20° C. using an automatic surface tension meter CBVP-Z (name of product manufactured by Kyowa Interface Science, Inc.), for example.

From similar viewpoints, the viscosity of the water-based ink jet ink composition at 20° C. is preferably equal to or greater than 3 mPa·s and equal to or less than 10 mPa·s and is more preferably equal to or greater than 3 mPa·s and equal to or less than 8 mPa·s in the embodiment. Note that for measuring the viscosity, the viscosity in the environment at 20° C. can be measured using a viscoelasticity tester MCR-300 (name of product manufactured by Pysica), for example.

1.2.9. Dark Ink Composition

In the embodiment, the water-based ink jet ink composition may be light ink and may be used along with dark ink. The dark ink may have constituents that may be included in the aforementioned water-based ink jet ink composition, the content thereof, ink properties, and the like independently from the aforementioned water-based ink jet ink composition other than that the ink is dark ink.

The content of the coloring material in the dark ink composition is preferably greater than the content of the coloring material in the water-based ink jet ink composition according to the embodiment, which is a light ink composition, by 1% by mass or greater, is preferably greater than the content of the coloring material in the water-based ink jet ink composition by 2% by mass or greater, and is further preferably greater than the content of the coloring material in the water-based ink jet ink composition by 3% by mass or greater. If the difference between the content of the coloring material in the dark ink composition and the content of the coloring material in the light ink composition falls within the aforementioned range, it is possible to obtain an image with high grayscale properties and high quality.

Note that the lower limit of the content of the coloring material that can be included in the dark ink composition is preferably greater than 1.5% by mass, is more preferably equal to or greater than 2.0% by mass, and is further preferably equal to or greater than 3.0% by mass. The upper limit value of the content is preferably equal to or less than 10% by mass, is more preferably equal to or less than 7% by mass, and is further preferably equal to or less than 6% by mass with respect to the total mass of the ink composition. If the content of the coloring material falls within the aforementioned range, the image formed on the recording medium has excellent water resistance, gas resistance, light resistance, and the like and satisfactory ink preservation properties.

1.3. Processing Solution

Next, the processing solution that is used by being caused to adhere to the recording medium along with the water-based ink jet ink composition will be described.

Note that in the embodiment, the content of the coloring material in the processing solution is equal to or less than 0.2% by mass, is preferably equal to or less than 0.1% by mass, and is more preferably equal to or less than 0.05% by mass, and the lower limit is 0% by mass. The processing solution is not the composition used to color the recording medium and is an auxiliary solution that is used by being caused to adhere to the recording medium before or after the ink composition is caused to adhere or at the same time with the ink composition.

Containing of constituents that may be included other than the coloring material of the aforementioned water-based ink jet ink composition, the content thereof, properties, and the like of the processing solution may be set independently from the aforementioned water-based ink jet ink composition other than that the processing solution includes a coagulant. It is possible to record an image with excellent image quality by using the processing solution. Meanwhile, abrasion resistance tends to be inferior. Further, thin lines of the image tend to become thinner, glossiness tends to be degraded, and clogging resistance tends to be degraded.

1.3.1. Coagulant

The processing solution used in the embodiment contains a coagulant that coagulates the constituents of the ink composition. The coagulant and the coloring material, the resin, and the like included in the ink composition quickly react in the ink composition adhesion process, which will be described later, by the processing solution including the coagulant. Thus, it is considered that since the dispersion state of the coloring material and the resin in the ink composition is destroyed, the coloring material and the resin are coagulated, and the coagulated product inhibit penetration of the coloring material into the recording medium, the recorded image has excellent improved image quality.

Examples of the coagulant include a polyvalent metal salt, a cationic resin, a cationic compound such as a cationic surfactant, an organic acid, and the like. One kind of these coagulants may be used alone, or two or more kinds of these coagulants may be used in combination. From these coagulants, at least one kind of coagulant selected from a group consisting of a polyvalent metal salt, an organic acid, and a cationic resin is preferably used from the viewpoint of excellent reactivity with the constituents included in the ink composition.

The polyvalent metal salt is a compound that is formed of a polyvalent metal ion of two or more valances and an anion bonded to the polyvalent metal ion and that is soluble in water. Specific examples of the polyvalent metal ion include bivalent metal ion such as $Ca_{2+}$, $Cu^{2+}$, $Ni^{2+}$, $Mg^{2+}$, $Zn^{2+}$, and $Ba^{2+}$; and trivalent metal ion such as $Al^{3+}$, $Fe^{3+}$, and $Cr^{3+}$. Examples of the anion include $Cl^-$, $I^-$, $Br^-$, $SO_4^{2-}$, $Cl^{3-}$, $NO^{3-}$, $HCOO^-$, $CH_3COO^-$, and the like. From among these polyvalent metal salts, a calcium salt and a magnesium salt are preferably used from the viewpoints of stability of the processing solution and reactivity as the coagulant.

Preferable examples of the organic acid include a phosphoric acid, a polyacrylic acid, an acetic acid, a glycol acid, a malonic acid, a malic acid, a maleic acid, an ascorbic acid, a succinic acid, a glutaric acid, a fumaric acid, a citric acid, a tartaric acid, a lactic acid, a sulfonic acid, an orthophosphoric acid, a pyrroidone carboxylic acid, a pyrone carboxylic acid, a pyrrole carboxylic acid, a furan carboxylic acid, a pyridine carboxylic acid, a coumaric acid, a thiophene carboxylic acid, a nicotinic acid, derivatives of these compounds, salts thereof, and the like. One kind of the organic acid may be used alone, or two or more kinds of organic acid may be used in combination. Salts of the organic acid that is polyvalent metal salts are included in the polyvalent metal salt.

Examples of the cationic resin include cationic urethane resin, cationic olefin resin, cationic amine-based resin, and the like. The cationic amine-based resin may be any resin that has an amino base, and examples thereof include allylamine resin, polyamine resin, a quaternary ammonium salt polymer, and the like. Examples of the polyamine resin include resin that has an amino base in a main skeleton. Examples of allylamine include resin that has a structure derived from an allyl group in a main skeleton. Examples of the quaternary ammonium salt polymer include resin that has a quaternary ammonium salt in the structure. From among the cationic resin, cationic amine-based resin has excellent reactivity and can easily be obtained, which is preferable.

As the cationic urethane resin, known cationic urethane resin can be appropriately selected and used. A commercially available product can be used as the cationic urethane resin, and examples thereof that can be used include Hydran CP-7010, CP-7020, CP-7030, CP-7040, CP-7050, CP-7060, and CP-7610 (all of which are names of products manufactured by Dainippon Ink and Chemicals, Incorporated), Superflex 600, 610, 620, 630, 640, 650 (all of which are names of products manufactured by DKS Co., Ltd.) Urethane emulsion WBR-2120C and WBR-2122C (all of which are names of products manufactured by Taisei Fine Chemical Co., Ltd.), and the like.

The cationic olefin resin has olefin such as ethylene or propylene in a structure skeleton, and known olefin resin can be optionally selected and used. In addition, the cationic olefin resin may be in an emulsion state in which the cationic olefin resin is dispersed in a solvent including water or organic solvent. A commercially available product can be used as the cationic olefin resin, and examples thereof include Arrow Base CB-1200 and CD-1200 (name of product manufactured by Unitika Ltd.) and the like.

A known cationic allylamine resin can appropriately be selected and used, and examples thereof include polyallylamine hydrochloride, polyallylamineamide sulfate, allylamine hydrochloride-diallylamine hydrochloride copolymer, an allylamine acetate-diallyamine acetate copolymer, an allylamine hydrochloride-dimethylallylamine hydrochloride copolymer, an allylamine-dimethylallylamine copolymer, polydiallylamine hydrochloride, polymethyldiallylamine hydrochloride, polymethyldiallylamineamide sulfate, polymethyldiallylamine acetate, polydiallyldimethylammonium chloride, a diallylamine acetate-sulfur dioxide copolymer, diallylmethylethylammoniumethyl sulfate-sulfur dioxide copolymer, a methyldiallylamine hydrochloride-sulfur dioxide copolymer, a diallyldimethylammonium chloride-sulfur dioxide copolymer, diallyldimethylammonium chloride-acrylamide copolymer, and the like. A commercially available product can be used as such a cationic allylamine resin, and examples thereof that can be used include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (all of which are names of products manufactured by Nittobo Medical Co., Ltd.), Neo-600, Hymoloc Q-101, Q-311, and Q-501, Hi-Macs SC-505 (all of which are names of products manufactured by Hyomo Co., Ltd.), and the like.

Examples of the cationic surfactant include primary, secondary, and tertiary amine salt compounds, an alkylamine salt, dialkylamine salt, aliphatic amine, a benzalkonium salt, a quaternary ammonium salt, a quaternary alkylammonium salt, an alkylpyridinium salt, a sulfonium salt, a phosphonium salt, an onium salt, an imidazolinium salt, and the like. Specific examples of the cationic surfactant include hydrochloride, acetate, and the like of lauryl amine, coconut amine, rosin amine, and the like, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetylpyridinium chloride, cetylpyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

The concentration of the coagulant in the processing solution is preferably equal to or greater than 0.5% by mass, is more preferably equal to or greater than 1% by mass, and is further preferably equal to or greater than 3% by mass with respect to the total mass of the processing solution. Also, the concentration of the coagulant in the processing solution is preferably equal to or less than 15% by mass, is more preferably equal to or less than 10% by mass, and is further preferably equal to or less than 5% by mass with respect to the total mass of the processing solution.

1.3.2. Water

The processing solution used in the embodiment is preferably a water-based processing solution that contains water as a main solvent. The water is a constituent that evaporates and flies by being dried after the processing solution is caused to adhere to the recording medium. As the water, pure water such as ion exchanged water, ultrafiltration water, reverse osmosis water, or distilled water or water from which ionic impurities have been removed as much as possible such as ultrapure water is preferably used. Water sterilized by ultraviolet irradiation, addition of hydrogen peroxide, or the like is preferably used since it is possible to prevent mold and bacteria from being generated in a case in which the processing solution is stored for a long period of time. The content of water included in the processing solution can be equal to or greater than 40% by mass, is preferably equal to or greater than 50% by mass, is more preferably equal to or greater than 60% by mass, and is further preferably equal to or greater than 70% by mass with respect to the total mass of the processing solution.

1.3.3. Organic Solvent

The processing solution used in the embodiment may contain an organic solvent. It is possible to improve wettability of the processing solution with respect to the recording medium by containing the organic solvent. An organic solvent that is similar to those exemplified above for the ink composition can be used. Although the content of the organic solvent is not particularly limited, the content thereof can be equal to or greater than 10% by mass and equal to or less than 80% by mass and is preferably equal to or greater than 15% by mass and equal to or less than 70% by mass with respect to the total mass of the processing solution.

A standard boiling point of the organic solvent can be the aforementioned preferable temperature range of the organic solvent that may be contained in the ink composition independently from the standard boiling point of the organic solvent that may be contained in the ink composition. Alternatively, the standard boiling point of the organic solvent is preferably equal to or greater than 180° C., is more preferably equal to or greater than 190° C., and is further preferably equal to or greater than 200° C. Also, the standard boiling point of the organic solvent is preferably equal to or less than 300° C., is more preferably equal to or less than 270° C., and is further preferably equal to or less than 250° C.

Note that the content of a water-soluble organic solvent with a standard boiling point of equal to or greater than 280° C. as the organic solvent in the processing solution is preferably equal to or less than 5% by mass, is more preferably equal to or less than 3% by mass, is more preferably equal to or less than 2% by mass, is further preferably equal to or less than 1% by mass, is more preferably equal to or less than 0.8% by mass, and is particularly preferably equal to or less than 0.1% by mass similarly to that in the aforementioned ink composition. In the aforementioned case, the processing solution is quickly dried, and reduction of stickiness and excellent abrasion resistance of the obtained recorded product are achieved.

1.3.4. Surfactant

A surfactant may be added to the processing solution used in the embodiment. It is possible to reduce surface tension of the processing solution and to improve wettability with respect to the recording medium. Among surfactants, it is possible to preferably use an acetylene glycol-based surfactant, a silicone-based surfactant, or a fluorine-based surfactant, for example. As for specific examples of these surfactants, surfactants that are similar to those exemplified above for the water-based ink jet ink composition can be used. Although the content of the surfactant is not particularly limited, the content can be equal to or greater than 0.1% by mass and equal to or less than 5% by mass with respect to the total mass of the processing solution.

1.3.5. Other Constituents

A pH adjuster, an antiseptic/fungicide, an anti-rust agent, a chelating agent, and the like as described above may be added as needed to the processing solution used in the embodiment.

1.3.6. Preparation Method of Processing Solution

The processing solution used in the embodiment can be manufactured by dispersing/mixing the aforementioned respective constituents by an appropriate method. After the aforementioned respective constituents are sufficiently stirred, filtration is performed to remove coarse particles and foreign matters that may cause clogging, thereby obtaining a target processing solution.

1.3.7. Physical Properties of Processing Solution

The surface tension at 20° C. of the processing solution used in the embodiment is preferably equal to or greater than 18 mN/m and equal to or less than 40 mN/m, is more preferably equal to or greater than 20 mN/m and equal to or less than 35 mN/m, and is further preferably equal to or greater than 22 mN/m and equal to or less than 33 mN/m. For measuring the surface tension, it is possible to perform the measurement by checking the surface tension when a platinum plate is wetted with the processing solution in an environment at 20° C. using an automatic surface tension meter CBVP-Z (name of product manufactured by Kyowa Interface Science, Inc.), for example.

From a similar viewpoint, the viscosity at 20° C. of the processing solution used in the embodiment is preferably equal to or greater than 3 mPa·s and equal to or less than 10 mPa·s and is more preferably equal to or greater than 3 mPa·s and equal to or less than 8 mPa·s. Note that for measuring the viscosity, the viscosity in the environment at 20° C. can be measured using a viscoelasticity tester MCR-300 (name of product manufactured by Pysica), for example.

1.4. Recording Medium

In the embodiment, it is possible to obtain an image with excellent abrasion resistance and excellent image quality in recording on an ink absorbable, ink low-absorbable, or non-absorbable recording medium by using the aforementioned resin with low reactivity in recording using the water-based ink jet ink composition that contains a small amount of coloring material with the processing solution in combination. By using the resin with low reactivity, in particular, it is possible to record an image with excellent abrasion resistance and image quality even in a region in which the amount of adhering ink is small in recording on the ink non-absorbable or low-absorbable recording medium.

Examples of the ink absorbable recording medium include clothes such as cotton, silk, polyester, polyurethane, and nylon with high ink absorbability, ordinary paper, ink jet dedicated paper, ordinary paper with intermediate absorbability such as high quality paper and recycled paper, copy paper, ink jet dedicated paper provided with an ink receiving layer with an ink absorbing ability.

Examples of the ink low-absorbable recording medium include a recording medium with a coated layer provided on the surface to receive ink. Examples of a recording medium including paper as a base material include print paper such as art paper, coated paper, matte paper, and examples of a recording medium including a plastic film as a base material include a recording medium with a surface of polyvinyl chloride, polyethylene terephthalate, polycarbonate, polystyrene, polyurethane, polyethylene, polypropylene, or the like coated with a hydrophilic polymer or coated with particles of silica, titanium, or the like along with a binder.

Examples of the ink non-absorbable recording medium include a plastic film on which surface processing for ink jet recording has not been performed, that is, on which no ink absorbing layer has been formed, a recording material with a base material such as paper coated with plastic or with a plastic film bonded thereto. Examples of plastic described herein include polyvinyl chloride, polyethylene terephthalate, polycarbonate, polystyrene, polyurethane, polyethylene, polypropylene, and the like.

Here, the "ink low-absorbable or non-absorbable recording medium" in the specification means "a recording medium with a water absorption amount of equal to or less than 10 mL/m$^2$ from start of contact to 30 msec$^{1/2}$ in the Bristow method". The Bristow method is a method that has most widely been distributed as a method of measuring a liquid absorption method in a short time and has also been employed by JAPAN TAPPI. Details of the test method are described in Standard No. 51 "Paper and sheet paper-liquid absorbability test method-Bristow method" in "JAPAN TAPPI paper pulp test method 2000".

Such a recording medium may be a semi-transparent recording medium or a transparent recording medium. In addition, the ink can be preferably used for an ink low-absorbable or non-absorbable recording medium with unevenness on the surface, such as embossed medium.

2. RECORDING METHOD

A first recording method according to the embodiment is a recording method using the water-based ink jet ink composition according to the aforementioned embodiment, and the method uses the water-based ink jet ink composition and a processing solution, the water-based ink jet ink composition contains a coloring material and resin, the content of the coloring material is equal to or greater than 1.5% by mass with respect to the ink composition, the volume average particle diameter of the resin after mixing the water-mediated solution of the resin and the 0.3M magnesium sulfate aqueous solution is equal to or less than three times as large as that before the mixing, the processing solution contains a coagulant for coagulating constituents of the ink composition, and the method includes: adhering the processing solution to a recording region on the recording medium (processing solution adhesion process); and causing the water-based ink jet ink composition to adhere to the recording medium (ink adhesion process).

As the processing solution, the aforementioned processing solution can be used. According to the aforementioned recording method, it is possible to provide a recording method capable of achieving excellent abrasion resistance and the like using the aforementioned processing solution.

Hereinafter, the recording method according to the embodiment will be described by exemplifying an example in which recording is performed using the aforementioned ink jet recording apparatus.

Here, the "region to which the ink composition has been caused to adhere" in the specification means a region to which dots of the ink composition have been caused to adhere.

The "region" referred in the specification represents a portion that occupies a specific area on the recording medium, in which the amount of the ink composition that is caused to adhere to the region is substantially constant. One region is a region that can be visually recognized to have the same color and has an area of equal to or greater than 1 mm$^2$, for example. In addition, substantially constant amount of adhesion means a macroscopic (macro) range in which the region is greater than the area of one dot although the amounts of adhering ink composition differ in a strict sense between a position at which the dot of the ink composition is caused to land and a position at which the dot of the ink composition is not caused to land in a case of a low duty, for example, and macroscopically, the amount of the adhering ink composition is constant in the region, and non-uniformity of the amounts of adhesion depending on whether or not the ink dots are caused to adhere is assumed to be ignored.

Note that in the specification, the "image" represents a recorded pattern formed by dot groups and includes a printed text and a solid image. Note that the "solid image" means an image pattern, which is obtained by recording dots on all pixels that are minimum recording unit regions defined by recording resolution such that the recording region on the recording medium is typically covered with the ink and the base of the recording medium is not seen.

2.1. Processing Solution Adhesion Process

The processing solution adhesion process is a process of causing the aforementioned processing solution that reacts with the ink composition to adhere to the recording medium. It is possible to improve abrasion resistance and image quality of the obtained printed image by causing the processing solution to adhere to the recording medium.

The processing solution adhesion process may be performed before the adhesion of the ink composition, after the adhesion of the ink composition, or at the same time with the adhesion of the ink composition. In a case in which the processing solution is caused to adhere before the adhesion of the ink composition or at the same time with the adhesion of the ink composition, the recording medium M is preferably heated with the preheater 7 illustrated in FIG. 1 before the processing solution adhesion process or with the IR heater 3 or the platen heater 4 illustrated in FIG. 1 during the processing solution adhesion process. The processing solution ejected onto the recording medium M tends to be easily spread on the recording medium M by causing the processing solution to adhere to the heated recording medium M, and it is possible to uniformly apply the processing solution. Therefore, the ink that is caused to adhere in a color ink adhesion process, which will be described later, and the processing solution sufficiently react with each other, and excellent image quality is obtained. Since the processing solution is uniformly applied to the recording medium M, it is possible to reduce the amount of application and to prevent abrasion resistance of the obtained image from being degraded.

Here, the surface temperature of the recording medium M when the processing solution is caused to adhere can be set independently from a preferable temperature range of the surface temperature (primary heating temperature) of the recording medium M when the color ink is caused to adhere, which will be described later. For example, the surface temperature of the recording medium M when the processing solution is caused to adhere is preferably equal to or less than 45° C., is more preferably equal to or less than 40° C., and is further preferably equal to or less than 38° C. Also, the lower limit value of the surface temperature of the recording medium M when the processing solution is caused to adhere is preferably equal to or greater than 25° C., is more preferably equal to or greater than 30° C., and is further preferably equal to or greater than 32° C. In a case in which the surface temperature of the recording medium M when the processing solution is caused to adhere falls within the aforementioned range, it is possible to uniformly apply the processing solution to the recording medium M and to improve abrasion resistance and image quality. Also, it is possible to suppress influences of heat on the ink jet head 2.

Note that the adhesion of the processing solution may be performed through ejection using the ink jet head 2 or by another method such as a method of applying the processing solution with a roll coater, a method of ejecting the processing solution, or the like, for example.

2.2. Ink Adhesion Process

The ink adhesion process is a process of ejecting the aforementioned water-based ink jet ink composition from the ink jet head 2 and causing the color ink to adhere, and an image of the water-based ink jet ink composition is formed on the surface of the recording medium M through this process. The recording region that is a region on which recording is performed on the recording medium has a region to which both the processing solution and the ink composition are caused to adhere. In a case in which light ink and dark ink are used, the region to which the light ink is caused to adhere and the region to which the dark ink is caused to adhere may be different regions, and/or both the light ink and the dark ink may be caused to adhere to the same region. Here, the recording region includes at least either the light ink or the dark ink.

In the embodiment, the ink adhesion process may include a process of causing the aforementioned water-based ink jet ink composition as the light ink composition to adhere to the recording medium and a process of causing the dark ink composition to adhere to the recording medium, and the process of causing the light ink composition to adhere to the recording medium and the process of causing the dark ink composition to adhere to the recording medium may or may not be performed at the same time.

The maximum amount of adhering water-based ink jet ink composition per unit area on the recording medium M is preferably equal to or greater than 5 mg/inch$^2$, is more preferably equal to or greater than 7 mg/inch$^2$, and is further preferably equal to or greater than 10 mg/inch$^2$. The upper limit of the amount of adhering the water-based ink jet ink composition per unit area of the recording medium is not particularly limited, is preferably equal to or less than 20 mg/inch$^2$, is preferably equal to or less than 18 mg/inch$^2$, and is particularly preferably equal to or less than 16 mg/inch$^2$. Note that the maximum amount of adhering ink composition is a total amount of the adhering light ink composition and the adhering dark ink composition in a case in which the water-based ink jet ink composition includes both the light ink composition and the dark ink composition.

FIG. 2 illustrates a relationship between a grayscale level of an image and the amount of adhering ink when the image is formed using dark and light ink. As illustrated in FIG. 2, the region in which the grayscale level is low is a low adhesion portion to which only a small amount of light ink has been caused to adhere. Meanwhile, the region in which the grayscale level is intermediate is an intermediate adhesion portion to which both the light ink and the dark ink have been caused to adhere, and the following region in which the grayscale level is high is a high adhesion portion to which only a large amount of the dark ink has been caused to adhere.

As illustrated in FIG. 2, since the amount of adhering ink is small in the region in which the light ink is used and the grayscale level is low, the absolute amount of adhering resin fine particles in the ink decreases, and abrasion resistance tends to become low. If the processing solution is used to improve image quality in a case in which recording is performed on an ink low-absorbable or a non-absorbable recording medium using the light ink, degradation of the abrasion resistance is reduced while ink dots do not spread, become small, and leads to unsatisfactory filling with the light ink. Therefore, image quality tends to be degraded at the low adhesion portion in which the light ink is used, the ink tends not to be smoothed by the processing solution, and abrasion resistance tends to decrease. Further, since the ink is caused to sparsely adhere to the low adhesion region, a matte image tends to be obtained, glossiness tends to become low, and a glossiness difference with the intermediate adhesion portion and the high adhesion portion tends to become noticeable.

Meanwhile, according to the recording method of the embodiment, it is possible to improve abrasion resistance and filling with the ink since the ink tends to spread and wet the ink low adhesion portion, and the ink coated film can be smoothed by the water-based ink jet ink composition containing the resin with low reactivity. In this manner, it is also possible to reduce the glossiness difference with the ink low adhesion portion and the high adhesion portion. As described above, according to the recording method of the embodiment, it is possible to secure abrasion resistance and image quality even in the region in which the amount of adhering ink is small and further to reduce the glossiness difference with the intermediate adhesion portion and the high adhesion portion in recording using the water-based ink jet ink composition that contains a small amount of coloring materials and the processing solution in combination.

In the embodiment, the recording region to which the processing solution and the water-based ink jet ink composition are caused to adhere in the recording region on the recording medium M may have an adhesion region in which the amount of adhering water-based ink jet ink composition is equal to or less than 8 mg/inch$^2$. Further, the recording region to which the processing solution and the water-based ink jet ink composition are caused to adhere may have an adhesion region in which the amount of adhering water-based ink jet ink composition is equal to or less than 6 mg/inch$^2$ or may have an adhesion region in which the amount of adhering water-based ink jet ink composition is equal to or less than 4 mg/inch$^2$. Also, the aforementioned adhesion region may be an adhesion region in which the amount of adhering water-based ink jet ink composition is equal to or greater than 0.1 mg/inch$^2$ or may be an adhesion region in which the amount of adhering water-based ink jet ink composition is equal to or greater than 0.5 mg/inch$^2$.

Further, the maximum amount of adhering water-based ink jet ink composition in the recording region to which the processing solution and the water-based ink jet ink composition are caused to adhere is preferably set within the aforementioned range.

Further, the recording region to which the processing solution and the dark ink composition that belongs to the same color system as that of the water-based ink jet ink composition and has higher color density are caused to adhere may have an adhesion region in which the amount of the adhering dark ink composition is greater than mg/inch$^2$. The recording region to which the aforementioned processing solution and the dark ink composition are caused to adhere may have an adhesion region in which the amount of the adhering dark ink composition is greater than 10 mg/inch$^2$ or may have an adhesion region in which the amount of the adhering dark ink composition is greater than 12 mg/inch$^2$. The aforementioned adhesion region may be an adhesion region in which the amount of the adhering dark ink composition is equal to or less than 20 mg/inch$^2$ or may be an adhesion region in which the amount of the adhering dark ink composition is equal to or less than 18 mg/inch$^2$. Further, the maximum amount of the adhering dark ink composition in the recording region to which the processing solution and the dark ink composition are caused to adhere is also preferably set within the aforementioned range.

In a case in which there is an adhesion region in which the aforementioned amount of adhesion is satisfied, it is possible to record an image with high brightness using the light ink and to record an image with low brightness using the dark ink, which is preferable.

In the embodiment, it is possible to provide a recording method capable of improving ink filling properties and abrasion properties at the low adhesion portion at which recording is performed only with the light ink, in particular, and achieving excellent abrasion resistance and image quality even in a case in which there is a difference in the amounts of adhering dark ink and adhering light ink in this manner. Further, it is possible to reduce a glossiness difference between the low adhesion portion and the intermediate adhesion portion or the high adhesion portion.

The ink adhesion process may include a heating process of heating the recording medium M with the IR heater 3 or the platen heater 4 before the ink adhesion process or at the same time with the ink adhesion process and is preferably performed on the recording medium M heated through the heating process. It is possible to quickly dry the ink on the recording medium M and to suppress bleeding through the heating process. Also, it is possible to form an image with excellent abrasion resistance and image quality.

The upper limit of the surface temperature (primary heating temperature) of the recording medium M when the ink is caused to adhere is preferably equal to or less than 45° C., is more preferably equal to or less than 40° C., and is further preferably equal to or less than 38° C. If the surface temperature of the recording medium when the ink is caused to adhere falls within the aforementioned range, it is possible to suppress influences of heat on the ink jet head 2 and to prevent clogging of the ink jet head 2 and the nozzles. The lower limit of the surface temperature of the recording medium M during the ink jet recording is preferably equal to or greater than 25° C., is more preferably equal to or greater than 28° C., is further preferably equal to or greater than 30° C., and is particularly preferably equal to or greater than 32° C. If the surface temperature of the recording medium M during the ink jet recording falls within the aforementioned range, it is possible to quickly dry the color ink on the recording medium M, to fix the color ink early, and to form an image with suppressed bleeding and excellent abrasion resistance and image quality.

2.3. Secondary Heating Process

The recording method according to the embodiment may have a secondary heating process (also referred to as a "post-heating process") of heating the recording medium M, to which the ink composition has been caused to adhere, with the hardening heater 5 illustrated in FIG. 1 after the aforementioned ink adhesion process. In this manner, the resin and the like included in the ink composition on the recording medium M are melted to form an ink film, the ink film is firmly fixed on the recording medium M to have excellent film forming properties, and it is thus possible to obtain an image with excellent abrasion resistance and high image quality.

The upper limit of the surface temperature of the recording medium M heated with the hardening heater 5 is preferably equal to or less than 120° C., is more preferably equal to or less than 110° C., and is more preferably equal to or less than 100° C. The lower limit of the surface temperature of the recording medium M is preferably equal to or greater than 60° C., is more preferably equal to or greater than 70° C., and is more preferably equal to or greater than 80° C. If the temperature falls within the aforementioned range, it is possible to secure clogging resistance and to obtain an image with excellent abrasion resistance and high image quality in a short time.

Note that a process of cooling the ink composition on the recording medium M with the cooling fan 6 illustrated in FIG. 1 may be provided after the secondary heating process.

2.4. Other Processes

The recording method according to the embodiment may include a cleaning process of causing the ink composition and the processing solution to be discharged with a mechanism other than a pressure generation mechanism for ejecting and recording the ink, that is, a mechanism other than the mechanism that is provided in the ink jet head 2 for recording.

Examples of the mechanism that is provided in the ink jet head 2 to eject ink for recording include a piezoelectric element that is provided in a pressure chamber (not illustrated) and applies a pressure to the ink and a heater element. The cleaning process may be a process of applying a pressure from the outside to the ink jet head 2 and causing the ink composition and the processing solution to be discharged from the nozzles. By providing this process, it is possible to suppress a concern that the resin is welded to the inner wall of the ink jet head 2 even in a case in which there is such a concern and to obtain further excellent ejection stability.

Note that examples of the aforementioned other mechanisms include mechanisms of applying a pressure, for example, applying a negative pressure (suction) or applying a positive pressure from the upstream of the ink jet head. These mechanisms do not correspond to the ink discharge (flushing) using the functions of the ink jet head itself. That is, this does not correspond to discharge using the mechanism of causing the ink to be ejected from the ink jet head for recording.

Further, the recording method according to the embodiment may have a clear ink adhesion process of causing clear ink to adhere to the surface of the recording medium M such that the clear ink partially or completely overlaps with the region to which the ink has been caused to adhere in the ink adhesion process on the surface of the recording medium M.

The clear ink adhesion process may be performed at the same time with the ink adhesion process or may be performed after the ink adhesion process. In a case in which the clear ink adhesion process is performed after the ink adhesion process, the clear ink adhesion process may be a process of overcoating the clear ink such that the clear ink partially or completely overlaps with the region to which the ink has been caused to adhere on the image formed with the ink on the recording medium M.

In the case in which the clear ink is caused to adhere to the recording medium such that the clear ink partially or entirely overlaps with the region to which the ink has been caused to adhere, it is only necessary for the clear ink to be caused to adhere such that the clear ink overlaps with at least a part of the region to which the color ink has been caused to adhere. Specifically, the clear ink is preferably caused to adhere such that the clear ink overlaps with 50% or more of the region to which at least the light ink in the dark and light ink has been caused to adhere, is more preferably caused to adhere such that the clear ink overlaps with 60% or more of the region, and is further preferably caused to adhere such that the clear ink overlaps with 70% or more. Further, the clear ink is caused to adhere such that the clear ink overlaps with 50% or more of the region to which the dark ink has been caused to adhere, is more preferably caused to adhere such that the clear ink overlaps with 60% or more of the region, and is further preferably caused to adhere such that the clear ink overlaps with 70% or more of the region. It is possible to provide a recording method capable of improving ink filling properties and abrasion resistance and achieving excellent abrasion resistance and image quality by causing the clear ink to adhere in this manner and compensating for the resin included in the clear ink at the low adhesion portion recorded only with the light ink.

The content of the resin is preferably equal to or greater than 0.5% by mass, is more preferably equal to or greater than 1% by mass, and is further preferably equal to or greater than 3% by mass in terms of solid content with respect to the total mass of the clear ink. Also, the content of the resin is preferably equal to or less than 10% by mass, is more preferably equal to or less than 7% by mass, and is further preferably equal to or less than 5% by mass in terms of solid content with respect to the total mass of the clear ink. If the content of the resin falls within the aforementioned range, it is possible to secure abrasion resistance and image quality at the low adhesion portion and further to reduce a glossiness difference with the intermediate adhesion portion and the high adhesion portion.

2.5. Second Recording Method

The second recording method according to the embodiment is a recording method using the water-based ink jet ink composition, the water-based ink jet ink composition and a processing solution are used, the water-based ink jet ink composition contains a coloring material and resin, the content of the coloring material is equal to or less than 1.5% by mass with respect to the ink composition, the volume average particle diameter of the resin after mixing the water-mediated solution of the resin and the processing solution is equal to or less than as large as that before the mixing, the processing solution contains a coagulant for coagulating constituents of the ink composition, and the method includes: causing the processing solution to adhere to the recording region on the recording medium (processing solution adhesion process); and causing the water-based ink jet ink composition to adhere to the recording medium (ink adhesion process).

As the processing solution, the aforementioned processing solution can be used. The water-based ink jet ink composition may have constituents that may be included in the aforementioned water-based ink jet ink composition, the content thereof, properties, and the like independently from the aforementioned water-based ink jet ink composition other than the aforementioned points. According to the aforementioned recording method, it is possible to provide a recording method providing excellent abrasion resistance using the aforementioned processing solution.

As described above, according to the recording method of the embodiment, it is possible to provide a recording method providing excellent abrasion resistance and image quality even in the region in which the grayscale level is low and the amount of adhering ink is small, in particular, by the water-based ink jet ink composition containing the resin with low reactivity in the recording using the water-based ink jet ink composition that contains a small amount of coloring material and the processing solution in combination. Further, it is possible to provide a recording method capable of reducing a glossiness difference between the low adhesion portion in which the amount of adhering ink is small and the intermediate adhesion portion or the high adhesion portion.

3. EXAMPLES

Hereinafter, the embodiment of the invention will be specifically described with reference to examples and comparative examples. However, the embodiment is not limited only to these examples.

3.1. Preparation of Ink and Processing Solution

The respective constituents were mixed and stirred such that the blending rates described in Tables 1 and 2 were bet, the mixture was filtered with a membrane filter with a pore diameter of 5 μm, thereby obtaining Ink 1 to 18 and Processing Solutions 1 to 3. All the numerical values in Tables 1 and 2 represent values in terms of % by mass, and water was added such that the total mass of the ink became 100%. Also, the values for the pigment and the resin represent values in terms of solid content.

TABLE 1

|  |  | Standard boiling point of solvent (° C.) | Ink 1 | Ink 2 | Ink 3 | Ink 4 | Ink 5 | Ink 6 | Ink 7 | Ink 8 | Ink 9 |
|---|---|---|---|---|---|---|---|---|---|---|---|
| Coloring material | Black resin | — | 0.5 | 0.5 | 0.5 | 0.5 | 0.5 | 0.5 | 0.5 | 0.5 | 0.5 |
|  | Cyan resin | — |  |  |  |  |  |  |  |  |  |
|  | Magenta resin | — |  |  |  |  |  |  |  |  |  |
| Resin | Resin A | — | 7 | — | — | 9 | 4 | 7 | 7 | 7 | 7 |
|  | Resin B | — | — | 7 | — | — | — | — | — | — | — |
|  | Resin C | — | — | — | 7 | — | — | — | — | — | — |
|  | Resin D | — |  |  |  |  |  |  |  |  |  |

TABLE 1-continued

| | | | | | | | | | | | |
|---|---|---|---|---|---|---|---|---|---|---|---|
| Solvent | 2-pyrrolidone | 245 | 20 | 20 | 20 | 20 | 20 | 25 | 15 | 10 | 20 |
| | 3-methoxy-N,N-dimethyl-propaneamide | 215 | | | | | | | | 10 | |
| | Propylene glycol | 189 | 10 | 10 | 10 | 10 | 10 | 10 | 10 | 10 | 9 |
| | 1,3-butylene glycol | 208 | | | | | | | | | |
| | glycerin | 290 | — | — | — | — | — | — | — | — | 1 |
| | 2-ethyl1,3-hexanediol | 243 | 3 | 3 | 3 | 3 | 3 | 3 | 3 | 3 | 3 |
| Surfactant | Siloxane-based | — | 1 | 1 | 1 | 1 | 1 | 1 | 1 | 1 | 1 |
| | Fluorine-based | — | | | | | | | | | |
| | Purified water | — | Residual | Residual | Residual | Residual | Residual | Residual | Residual | Residual | Residual |
| | Total | | 100 | 100 | 100 | 100 | 100 | 100 | 100 | 100 | 100 |

| | | Standard boiling point of solvent (° C.) | Ink 10 | Ink 11 | Ink 12 | Ink 13 | Ink 14 | Ink 15 | Ink 16 | Ink 17 | Ink 18 |
|---|---|---|---|---|---|---|---|---|---|---|---|
| Coloring material | Black resin | — | 0.5 | 0.5 | | | 0.5 | | | 3 | 3 |
| | Cyan resin | — | | | 0.5 | | | 0.5 | | | |
| | Magenta resin | — | | | | 0.5 | | | 0.5 | | |
| Resin | Resin A | — | 7 | 7 | 7 | 7 | — | — | — | 5 | — |
| | Resin B | — | — | — | — | — | — | — | — | — | — |
| | Resin C | — | — | — | — | — | — | — | — | — | — |
| | Resin D | — | | | | | 7 | 7 | 7 | | 5 |
| Solvent | 2-pyrrolidone | 245 | 20 | 20 | 20 | 20 | 20 | 20 | 20 | 20 | 20 |
| | 3-methoxy-N,N-dimethyl-propaneamide | 215 | | | | | | | | | |
| | Propylene glycol | 189 | 10 | 3 | 10 | 10 | 10 | 10 | 10 | 10 | 10 |
| | 1,3-butylene glycol | 208 | | 7 | | | | | | | |
| | glycerin | 290 | — | — | — | — | — | — | — | — | — |
| | 2-ethyl1,3-hexanediol | 243 | 3 | 3 | 3 | 3 | 3 | 3 | 3 | 3 | 3 |
| Surfactant | Siloxane-based | — | | 1 | 1 | 1 | 1 | 1 | 1 | 1 | 1 |
| | Fluorine-based | — | 1 | | | | | | | | |
| | Purified water | — | Residual | Residual | Residual | Residual | Residual | Residual | Residual | Residual | Residual |
| | Total | | 100 | 100 | 100 | 100 | 100 | 100 | 100 | 100 | 100 |

TABLE 2

| | | Standard boiling point of solvent (° C.) | Processing solution 1 | Processing solution 2 | Processing solution 3 |
|---|---|---|---|---|---|
| Coagulant | Magnesium sulfate heptahydrate | — | 7 | — | — |
| | JETFIX 260 | — | — | 4 | — |
| | Malonic acid | — | — | — | 7 |
| Solvent | 2-pyrrolidone | 245 | 15 | 15 | 15 |
| | 3-methoxy-N,N-dimethylpropaneamide | 215 | | | |
| | Propylene glycol | 189 | 10 | 10 | 10 |
| | 1,3-butylene glycol | 208 | | | |
| | Glycerin | 290 | — | — | — |
| | 2-ethyl1,3-hexanediol | 243 | | | |
| Surfactant | Siloxane-based | — | 1 | 1 | 1 |
| | Purified water | — | Residual | Residual | Residual |
| | Total | | 100 | 100 | 100 |

Details of the substance described in Tables 1 and 2 were as follows.

Coagulant

Polyvalent metal salt: magnesium sulfate heptahydrate

Cationic resin: Jetfix 260 (name of product manufactured by Satoda Chemical Industrial Co., Ltd.; amine-based resin)

Organic acid: malonic acid

Coloring Material

Synthesis of Pigment Dispersant Resin 40 parts by mass of styrene-acryl copolymer (copolymerized at a mass ratio of methacrylic acid/butyl acrylate/styrene/hydroxyethyl acrylate =25/50/15/10; weight average molecular weight: 7000; acid value: 150 mgKOH/g) was poured into a solution obtained by mixing 7 parts by mass of potassium hydroxide, 23 parts by mass of water, and 30 parts by mass of triethylene glycol-mono-n-butylether, the mixture was heated at 80° C. while being stirred, thereby preparing an aqueous resin solution.

The following pigment and the aforementioned pigment dispersant resin were mixed with water at a mass ratio of 5:1 in solid content and were stirred with a bead mill, thereby obtaining a pigment dispersion. The concentration of the pigment in the pigment dispersion was set to 20% by mass. A change in the particle diameter of each pigment dispersion was checked in accordance with a method of checking a change in a particle diameter of resin, which will be described later, and the change in all the pigment dispersions was equal to or greater than five times.

Black pigment: carbon black (C.I. Pigment Black 7)

Resin

Preparation Example of Styrene Acrylic Resin Emulsion 75 parts by mass of styrene, 0.5 parts by mass of acrylic acid, 14.5 parts by mass of methyl methacrylate, and 10 parts by mass of cyclohexyl methacrylate were emulsion-copolymerized, thereby obtaining a styrene acrylic resin emulsion. Note that Newcol NT-30 (manufactured by Nippon Nyukazai Co., Ltd.) was used as a surfactant for emulsion polyermzation and the amount of use was set to 2 parts by mass on the assumption that the total mass of the monomer was 100 parts by mass.

The types and the mass parts of acrylic monomer used were changed on the basis of the aforementioned preparation example, and following Resin A, B, and D was prepared. Commercially available urethane resin emulsions were obtained, changes in particle diameters were checked, and resin that satisfied the following values was used as Resin C.

Resin A: styrene-acrylic acid copolymer emulsion; acid value: 0 mgKOH/g; change in particle diameter: 1.2 times Resin B: styrene-acrylic acid copolymer emulsion; acid value: 10 mgKOH/g; change in particle diameter: 2.0 times Resin C: anionic polycarbonate-based urethane self-emulsion-type urethane resin emulsion; change in particle diameter: 1.1 times Resin D: styrene-acrylic acid copolymer emulsion; acid value: 20 mgKOH/g; change in particle diameter: 5.0 times Surfactant Siloxane-based surfactant: BYK348 (name of product manufactured by BYK Additives & Instruments)

Fluorine-based surfactant: Surfron S-241 (name of product manufactured by AGC Seimi Chemical Co., Ltd.)

3.2. Evaluation of Reactivity of Resin

Resin solutions obtained by dispersing the aforementioned four kinds of resin in water (resin emulsions) were diluted with pure water such that the concentration of the solid content thereof was 1% by mass. In an environment at 25° C., volume average particle diameters (D50) when the resin solutions were mixed and stirred with a processing solution of 0.3 M magnesium sulfate at 1:1 for 1 minute were measured, and a change in the particle diameter before and the mixture was checked to check the aforementioned change in the particle diameter.

3.3. Evaluation of Ink and Recording Method

Next, evaluation tests were conducted using the ink and the processing solutions described in Tables 1 and 2.

3.3.1. Image Formation

A modified machine of an ink jet printer (name of product "SC-S40650" manufactured by Seiko Epson Corporation) was prepared, two heads of the ink jet printer were assumed to be upstream and downstream heads in the order from the upstream side to the downstream side in the transport direction of a recording medium. A configuration including a platen heater at a shared platen that faced the upstream and downstream heads and including a secondary dryer furnace on the downstream of the heads was employed. Temperatures of the heater and the secondary dryer furnace were able to be adjusted. As the recording medium, polyvinyl chloride films for indoor and outdoor signs (name of product "IJ180-10" manufactured by 3M Japan Limited) were used.

One nozzle array of the upstream head was filled with a processing solution, and each nozzle array of the downstream head was filled with the ink and the dark ink in accordance with combinations described in Tables 3 and 4. The maximum resolution was set to 1440×1400 dpi for each ink and each processing solution, and the amounts of ink and the densities of dots were adjusted such that the amounts of adhesion were set to the values in the tables. The test pattern for evaluation other than thin line evaluation was a test pattern with a size of 20×20 cm. The test pattern for the thin line evaluation will be described later.

The recording medium was heated with the platen heater at the time of the adhesion of the ink, and secondary drying (post-drying) was performed with the secondary drying furnace after the adhesion of the ink. The surface temperatures of the recording medium at the time of the adhesion of the ink and at the time of the secondary drying were set to the values in the table. Note that in Reference Example 6, the amount of adhering ink was set to 4 mg for Ink 1 and 11 mg for Ink 17.

TABLE 3

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Name of ink | Ink 1 | Ink 2 | Ink 3 | Ink 4 | Ink 5 | Ink 6 | Ink 7 | Ink 8 | Ink 9 | Ink 10 | Ink 11 |
| Name of processing solution | Processing solution 1 | Processing solution 1 | Processing solution 1 | Processing solution 1 | Processing solution 1 | Processing solution 1 | Processing solution 1 | Processing solution 1 | Processing solution 1 | Processing solution 1 | Processing solution 1 |
| Amount of adhering ink (mg/inch$^2$) | 4 | 4 | 4 | 4 | 4 | 4 | 4 | 4 | 4 | 4 | 4 |

TABLE 3-continued

| | | | | | | | | | | | |
|---|---|---|---|---|---|---|---|---|---|---|---|
| Amount of adhering processing solution (relative to mass % of ink) | 10% | 10% | 10% | 10% | 10% | 10% | 10% | 10% | 10% | 10% | 10% |
| Temperature during adhesion (° C.) | 35 | 35 | 35 | 35 | 35 | 35 | 35 | 35 | 35 | 35 | 35 |
| Temperature during secondary drying (° C.) | 80 | 80 | 80 | 80 | 80 | 80 | 80 | 80 | 80 | 80 | 80 |
| Abrasion resistance | B | C | A | A | C | A | C | A | C | B | B |
| Image quality | B | B | B | B | B | B | B | B | C | B | B |
| Image quality (thin line) | B | B | B | B | B | B | B | B | A | A | A |
| Glossiness difference | B | C | A | B | B | B | B | A | A | A | B |
| Clogging resistance | B | B | C | C | A | C | A | C | A | B | B |

| | Example 12 | Example 13 | Example 14 | Example 15 | Example 16 | Example 17 | Example 18 | Example 19 | Example 20 | Example 21 |
|---|---|---|---|---|---|---|---|---|---|---|
| Name of ink | Ink 12 | Ink 13 | Ink 1 | Ink 1 | Ink 1 | Ink 1 | Ink 1 | Ink 1 | Ink 1 | Ink 1 |
| Name of processing solution | Processing solution 1 | Processing solution 1 | Processing solution 2 | Processing solution 3 | Processing solution 1 | Processing solution 1 | Processing solution 1 | Processing solution 1 | Processing solution 1 | Processing solution 1 |
| Amount of adhering ink (mg/inch$^2$) | 4 | 4 | 4 | 4 | 2 | 7 | 4 | 4 | 4 | 4 |
| Amount of adhering processing solution (relative to mass % of ink) | 10% | 10% | 10% | 10% | 10% | 10% | 10% | 10% | 5% | 30% |
| Temperature during adhesion (° C.) | 35 | 35 | 35 | 35 | 35 | 35 | 40 | 35 | 35 | 35 |
| Temperature during secondary drying (° C.) | 80 | 80 | 80 | 80 | 80 | 80 | 80 | 70 | 80 | 80 |
| Abrasion resistance | A | A | A | B | C | A | B | C | B | C |
| Image quality | B | B | B | C | B | B | B | B | B | B |
| Image quality (thin line) | B | B | A | A | C | A | C | B | A | C |
| Glossiness difference | A | A | A | B | A | B | B | B | B | C |
| Clogging resistance | B | B | B | B | B | B | C | B | B | B |

TABLE 4

| | Comparative Example 1 | Comparative Example 2 | Comparative Example 3 | Reference Example 1 | Reference Example 2 | Reference Example 3 | Reference Example 4 | Reference Example 5 | Reference Example 6 |
|---|---|---|---|---|---|---|---|---|---|
| Name of ink | Ink 14 | Ink 15 | Ink 16 | Ink 1 | Ink 14 | Ink 17 | Ink 18 | Ink 1 | Ink 1 + Ink 17 |
| Name of processing solution | Processing solution 1 | Processing solution 1 | Processing solution 1 | — | — | Processing solution 1 | Processing solution 1 | Processing solution 1 | Processing solution 1 |
| Amount of adhering ink (mg/inch$^2$) | 4 | 4 | 4 | 4 | 4 | 15 | 15 | 15 | 15 |
| Amount of adhering processing solution (relative to mass % of ink) | 10% | 10% | 10% | — | — | 10% | 10% | 10% | 10% |
| Temperature during adhesion (° C.) | 35 | 35 | 35 | 35 | 35 | 35 | 35 | 35 | 35 |
| Temperature during secondary drying (° C.) | 80 | 80 | 80 | 80 | 80 | 80 | 80 | 80 | 80 |
| Abrasion resistance | E | D | D | A | A | A | B | A | A |
| Image quality | A | A | A | D | D | B | A | B | B |
| Image quality (thin line) | C | B | B | A | A | A | A | A | A |
| Glossiness difference | C | B | B | A | A | A | C | B | A |
| Clogging resistance | C | C | C | A | A | B | A | — | |

3.3.2. Evaluation of Image Quality

The test patterns obtained in the image formation were visually determined, and evaluation on the basis of the following criteria was performed.

Evaluation Criteria

A: No variations were observed in density in the pattern.
B: Small variations were slightly observed in density in the pattern.
C: A large amount of large and noticeable variations were observed in the pattern.
D: A large amount of large and noticeable variations were observed in the pattern. Also, the outline of the pattern caused bleeding, did not look like a straight line, and provided undesirable looking.

3.3.3. Evaluation of Abrasion Resistance

Abrasion resistance of the test patterns obtained in the image formation was evaluated using an abrasion resistance/ wet friction resistance: JSPS-type fastness-to-friction tester AB-301 (name of product manufactured by Tester Sangyo Co., Ltd.). Specifically, the surface of the recording medium on which an image was recorded with rubbed over ten round trips with a friction element with white cotton cloth (in accordance with JIS L 0803) attached thereto while a load of 500 g was applied thereto. Then, how the image (coated film) was peeled off from the surface of the recording medium was visually observed and was evaluated on the basis of the following criteria.

Evaluation Criteria

A: Neither peeling of the pattern portion nor color staining on the cotton cloth were observed.
B: No peeling of the pattern portion was observed while color staining on the cotton cloth was slightly observed.
C: Peeling of the pattern portion was within 10% of the rubbed area.
D: Peeling of the pattern portion was greater than 10% and equal to or less than 30% of the rubbed area.
E: Peeling of the pattern portion was greater than 30%.

3.3.4. Evaluation of Image Quality (Thin Line)

The processing solution was caused to adhere similarly to the test pattern other than the thin line evaluation. A 0.3 mm line with the length of 10 cm was recorded in the main scanning direction with the ink on the processing solution layer. The amounts of adhering ink in the line were set to the values in the table. The obtained line was observed with a magnifying glass and was evaluated on the basis of the following criteria.

Evaluation Criteria

A: The outline of the line was straight.
B: The outline of the line was not straight at some portions.
C: The line was disconnected at some portions.

3.3.5. Evaluation of Glossiness Difference

The test patterns obtained in the image formation were placed obliquely such that fluorescent light was reflected, and glossiness in the dark ink pattern portion and glossiness in the light ink pattern portion were visually compared and were evaluated on the basis of the following criteria.

Evaluation Criteria

A: No glossiness difference was observed between the patterns.
B: A slight glossiness difference was observed between the patterns.
C: A noticeable glossiness difference was observed between the patterns.

3.3.6. Evaluation of Clogging Resistance

Simulation recording was continuously performed for 1 hour under recording conditions for image formation, non-ejection from the nozzle arrays (360 nozzles) was inspected after the completion and was evaluated on the basis of the following criteria. As the simulation recording, flashing of ejecting the ink to a flashing box between the main scanning and the next main scanning without ejecting the ink from the nozzles during the main scanning was performed in the examples in which the amount of adhesion was equal to or less than 7. In the examples in which the amount of adhesion exceeded this value, the ink was continuously ejected onto the recording medium during the main scanning, and flashing was performed between the main scanning and the next main scanning. The simulation recording was for simulating that the ink was not ejected during recording in a case in which the amount of adhesion was small in the recording and that a large number of nozzles ejected more ink during the recording.

Evaluation Criteria

A: There were no nozzles that did not eject ink.
B: The rate of nozzles that did not eject ink was equal to or less than 2%.
C: The rate of nozzles that did not eject ink was greater than 2% and equal to or less than 4%.
D: The rate of nozzles that did not eject ink was greater than 4%.

3.4. Evaluation Results

Results of the evaluation test are shown in Tables 3 and 4.

In all the examples using the resin with a change in volume average particle diameter of equal to or less than three times after the mixing and 1.5% by mass or less of coloring material, the ink, and the processing solution, excellent abrasion resistance was achieved. Meanwhile, abrasion resistance was inferior in all the comparative examples in which the resin, the ink, and the processing solution were not used. Details will be described below.

In Comparative Examples 1 to 3, high abrasion resistance and larger glossiness differences were obtained as the reactivity of the resin decreased. If the urethane resin was used as the resin, further higher abrasion resistance and a further larger glossiness difference were achieved while clogging resistance was degraded.

In Examples 1, 4, and 5, higher abrasion resistance was achieved as the content of the resin was larger while higher clogging resistance was achieved as the content of the resin was smaller.

In comparison between Example 1 and Examples 6 to 8, higher abrasion resistance was achieved as the amount of nitrogen-containing solvent increased while higher clogging resistance was achieved as the amount of nitrogen-containing solvent decreased. If the ink also included alkoxy alkyl aides as the nitrogen-containing solvent, abrasion resistance and a glossiness difference were improved since the resin on the recording medium was dissolved while clogging of nozzles slightly occurred.

In comparison between Examples 1 and 9, abrasion resistance and image quality were degraded while a thin line, a glossiness difference, and clogging resistance were improved if the ink includes the solvent with a high boiling point.

In comparison between Examples 1 and 10, evaluation on a thin line and a glossiness difference was improved in the case in which the surfactant was the fluorine-based surfactant.

In comparison between Examples 1 and 11, evaluation on a thin line was improved in the case in which the organic solvent that was a solvent with a slightly high boiling point was included.

In comparison between Examples 1 and Examples 12 and 13, similar results were observed even when different coloring materials were used while the results represented that problems tended to occur in abrasion resistance and a glossiness difference in a case in which carbon black was used as a coloring material.

In Examples 1, 14, and 15, more excellent abrasion resistance, a thin line, and a glossiness difference were achieved by using the cationic resin as the coagulant that was included in the processing solution.

In Examples 1, 16, and 17, evaluation on abrasion resistance and a thin line was higher for the large amount of adhering ink while a smaller glossiness difference was achieved as the amount of adhering ink decreased.

In Examples 1 and 18, a more excellent thin line and clogging resistance were achieved as the temperature at the time of the adhesion of the ink was lower. Meanwhile, since the resin was sufficiently melted on the recording medium, and film formation was promoted as the temperature for the secondary drying was higher, higher abrasion was achieved as a result.

In Examples 1, 20, and 21, higher abrasion resistance was achieved as the amount of adhering processing solution increased while evaluation on a thin line was higher as the amount of adhering processing solution decreased.

In contrast to these examples, excellent image quality was achieved while abrasion resistance, in particular, deteriorated, and evaluation on a thin line, a glossiness difference, and clogging resistance also deteriorated due to excessively higher reactivity of the resin in Comparative Examples 1 to 3. This trend was significantly observed in a case in which carbon black was used as a coloring material, in particular.

Reference Examples 1 and 2 are examples in which recording was performed without using the processing solution, and image quality was degraded while other problems in abrasion resistance and the like did not occur in the case in which the processing solution was not used.

Reference Examples 3 and 4 are examples of dark ink in which the content of the coloring material in the water-based ink jet ink composition as large. Although the dark ink was ink that was used with a large amount of adhesion, no problem occurred in abrasion resistance even when resin with high reactivity was used as the resin.

Further, Reference Example 5 was an example in which the ink in which the content of the coloring material was small was caused to adhere with a large amount of adhesion, and still no problem occurred in abrasion resistance similarly to Reference Examples 3 and 4.

Reference Examples 6 is an example in which the total amount of adhering dark and light ink was large, and no problems still occurred in abrasion resistance and image quality in a case in which the amount of adhering ink was large.

Note that although there was no description in the tables, when preparation was performed and evaluation was conducted similarly to Example 1 other than that resin with a lower acid value was prepared as the pigment dispersant resin in Example 1, a change in the particle diameter of the pigment was about two times. Dispersion stability of the pigment dispersion was slightly degraded, and image quality was slightly degraded. It was found out from this results that the change in the particle diameter of the pigment was preferably larger.

When changes in the volume average particle diameters of Resin A, B, C, and D after being mixed with Processing Solutions 1, 2, and 3 were measured, the changes in the volume average particle diameters of Resin A, B, and C were equal to or less than three times, and that of Resin D was greater than three times with any processing solution. It was found out that the changes in the volume average particle diameters of the resin using the aforementioned test solutions served as scales for the changes in the particle diameters.

As described above, not only excellent image quality and abrasion resistance but also satisfactory results of clogging properties were achieved even in the region in which the amount of adhering ink was small in the recording using the water-based ink jet ink composition that contained a small amount of coloring material and the processing solution in combination in all the examples.

The invention is not limited to the aforementioned embodiment, and various modifications can be made. For example, the invention includes configurations that are substantially the same (for example, configurations with the same functions, methods, and results or configurations with the same purposes and advantages) as the configuration described in the embodiment. Also, the invention includes configurations in which portions that are not essential in the configuration described in the embodiment are replaced.

Also, the invention includes configurations with which effects and advantages that are same as those of the configuration described in the embodiment can be obtained or configurations with which the same purposes can be achieved. In addition, the invention includes configurations in which known techniques are added to the configuration described in the embodiment.

The entire disclosure of Japanese Patent Application No. 2018-049421, filed Mar. 16, 2018 is expressly incorporated by reference herein.

What is claimed is:

1. An ink set comprising:
    a light water-based ink jet ink composition, a dark water-based ink jet ink composition, and a processing solution, where the light water-based ink jet ink composition and the dark water-based ink jet ink composition each belong to a same color system;
    the light water-based ink jet ink composition contains:
    a first coloring material; and
    a first resin, a content of the first coloring material being equal to or less than 1.5% by mass with respect to the light water-based ink jet ink composition,
    wherein the first resin is configured such that a volume average particle diameter of the resin changes in an amount that is equal to or less than three times an original volume average particle diameter of the resin when a water-mediated solution including the resin is mixed with a 0.3M magnesium sulfate aqueous solution,
    the dark water-based ink jet ink composition contains:
    a second coloring material; and
    a second resin, wherein a content of the second coloring material in the dark water-based ink jet ink composition is greater than a content of the first coloring material in the light water-based ink let ink composition; and
    the processing solution contains a coagulant for coagulating constituents of the ink composition,
    the light water-based ink jet ink composition, the dark water-based ink jet ink composition, and the processing solution are used by being caused to adhere to a recording medium.

2. The ink set according to claim 1,
    wherein a content of the first resin in the light water-based ink jet ink composition is equal to or greater than 2% by mass.

3. The ink set according to claim 1,
wherein the processing solution includes at least one of a cationic resin, an organic acid, and a polyvalent metal salt as the coagulant.

4. The ink set according to claim 1,
wherein a content of an organic solvent of polyols with a standard boiling point of equal to or greater than 280° C. is equal to or less than 0.8% by mass with respect to the light water-based ink jet ink composition.

5. The ink set according to claim 1, wherein the light water-based ink jet ink composition further comprises:
a nitrogen-containing solvent.

6. The ink set according to claim 1,
wherein the light water-based ink jet ink composition is a light black ink.

7. The ink set according to claim 1,
wherein the dark water-based ink jet ink composition includes a content of the second resin that is equal to or greater than 2% by mass.

8. The ink set according to claim 1,
wherein
the content of the second coloring material in the dark water-based ink jet ink composition is greater than the content of the first coloring material in the light water-based ink jet ink composition by 1% by mass or greater.

9. The ink set according to claim 1,
wherein the first resin of the light water-based ink jet ink composition includes either acrylic resin or urethane-based resin.

10. The ink set according to claim 8,
wherein a pigment is included as the first coloring material in the light water-based ink jet ink composition, and
the pigment is configured such that a volume average particle diameter of the pigment changes in an amount that is greater in comparison to an original volume average particle diameter of the pigment when a water-mediated solution including the pigment is mixed with a 0.3M magnesium sulfate aqueous solution.

11. A recording method using the ink set according to claim 1, the method comprising:
causing the processing solution to adhere to the recording medium; and
causing the light water-based ink jet ink composition and the dark water-based ink jet ink composition to adhere to the recording medium.

12. A recording method using the ink set according to claim 2, the method comprising:
causing the processing solution to adhere to the recording medium; and
causing the light water-based ink jet ink composition and the dark water-based ink jet ink composition to adhere to the recording medium.

13. A recording method using the ink set according to claim 3, the method comprising:
causing the processing solution to adhere to the recording medium; and
causing the light water-based ink jet ink composition and the dark water-based ink jet ink composition to adhere to the recording medium.

14. The recording method according to claim 11,
wherein a recording region, to which the processing solution and the light water-based ink jet ink composition are adhered on the recording medium includes a region where the light water-based ink jet ink composition is adhered in an amount that is equal to or less than 8 mg/inch$^2$.

15. The recording method according to claim 14,
wherein the recording region, to which the processing solution and the dark water-based ink jet ink composition are adhered on the recording medium includes a region where the dark water-based ink jet ink composition is adhered in an amount that is greater than 8 mg/inch$^2$.

16. The recording method according to claim 11,
wherein recording is performed on a low-absorbable recording medium and a non-absorbable recording medium.

17. A recording apparatus that performs recording by the recording method according to claim 11.

18. The ink set according to claim 1, wherein a content of the first coloring material in the light water-based ink jet ink composition is 0.05 to 1.5% by mass.

19. The ink set according to claim 1, wherein a content of the second coloring material in the dark water-based ink jet ink composition is greater than 1.5% by mass and equal to or less than 10% by mass.

20. The ink set according to claim 1, wherein the dark water-based ink jet ink composition is a black ink, a yellow ink, a magenta ink, or a cyan ink.

* * * * *